(12) United States Patent
Kobayashi et al.

(10) Patent No.: US 12,036,893 B2
(45) Date of Patent: Jul. 16, 2024

(54) POWER SUPPLY SYSTEM

(71) Applicant: DENSO CORPORATION, Kariya (JP)

(72) Inventors: Naoto Kobayashi, Nisshin (JP); Syuji Kurauchi, Kariya (JP); Yuuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 191 days.

(21) Appl. No.: 17/570,057

(22) Filed: Jan. 6, 2022

(65) Prior Publication Data

US 2022/0131401 A1 Apr. 28, 2022

Related U.S. Application Data

(63) Continuation of application No. PCT/JP2020/026578, filed on Jul. 7, 2020.

(30) Foreign Application Priority Data

Jul. 9, 2019 (JP) ................ 2019-127581

(51) Int. Cl.
*B60L 58/27* (2019.01)
*B60L 53/60* (2019.01)
(Continued)

(52) U.S. Cl.
CPC ............ *B60L 58/27* (2019.02); *B60L 53/60* (2019.02); *B60L 58/25* (2019.02);
(Continued)

(58) Field of Classification Search
CPC ...... B60L 53/60; B60L 58/25; H01M 10/625; H01M 10/633; H01M 10/6567; H01M 10/6571; H01M 2220/20; H02J 7/007192
See application file for complete search history.

(56) References Cited

U.S. PATENT DOCUMENTS 5,834,132 A 11/1998 Hasegawa et al.
2018/0050605 A1* 2/2018 Lewis ................ B60L 58/25

FOREIGN PATENT DOCUMENTS

JP 2014-026814 A 2/2014
JP 2015-220949 A 12/2015
(Continued)

OTHER PUBLICATIONS

Sep. 24, 2020 International Search Report issued in International Patent Application No. PCT/JP2020/026578.

*Primary Examiner* — Daniel Cavallari
(74) *Attorney, Agent, or Firm* — Oliff PLC

(57) ABSTRACT

A power supply system includes a power conversion circuit that is connectable to a power storage unit. The power supply system includes a control unit and a heat transferring unit. The control unit supplies a current between the power storage unit and the power conversion circuit by performing on-off control of a switch that configures the power conversion circuit. The heat transferring unit absorbs heat that is generated in the power conversion circuit in accompaniment with the on-off control of the switch and transfers the heat to a temperature-increase target element. The control unit performs temperature-increase mode control in which the switch is on-off controlled such that an amount of heat that is generated in the power conversion circuit is increased when a temperature-increase request for the temperature-increase target element is present, compared to when the temperature-increase request is not present.

16 Claims, 21 Drawing Sheets

(51) Int. Cl.
*B60L 58/25* (2019.01)
*H01M 10/625* (2014.01)
*H01M 10/633* (2014.01)
*H01M 10/6567* (2014.01)
*H01M 10/6571* (2014.01)
*H02J 7/00* (2006.01)
*H02M 3/00* (2006.01)
*H02M 3/335* (2006.01)

(52) U.S. Cl.
CPC ....... *H01M 10/625* (2015.04); *H01M 10/633* (2015.04); *H01M 10/6567* (2015.04); *H01M 10/6571* (2015.04); *H02J 7/007192* (2020.01); *H02M 3/00* (2013.01); *H02M 3/335* (2013.01); *B60L 2210/10* (2013.01); *H01M 2220/20* (2013.01); *H02M 3/33573* (2021.05)

(56) References Cited

FOREIGN PATENT DOCUMENTS

| | | | |
|---|---|---|---|
| JP | 2016-077076 A | 5/2016 | |
| JP | 2016-146252 A | 8/2016 | |

* cited by examiner

<T1>

<T2>

⟨T3⟩

⟨T4⟩

POWER SUPPLY SYSTEM

CROSS-REFERENCE TO RELATED APPLICATIONS

The present application is a continuation application of International Application No. PCT/JP2020/026578, filed on Jul. 7, 2020, which claims priority to Japanese Patent Application No. 2019-127581, filed on Jul. 9, 2019. The contents of these applications are incorporated herein by reference in their entirety.

BACKGROUND

Technical Field

The present disclosure relates to a power supply system that includes a power conversion circuit that is connectable to a power storage unit.

Related Art

Conventionally, a power supply system that is mounted in an electric vehicle and includes a storage battery that is electrically connected to a motor that serves as a traveling power source of the electric vehicle is known. This system has a configuration in which cooling water flows near the storage battery. The cooling water is heated by an electric heater. The power supply system increases a temperature of the cooling water by controlling output of the electric heater based on a temperature of the storage battery and maintains the temperature of the storage battery within a predetermined temperature range.

SUMMARY

One aspect of the present disclosure provides a power supply system that includes a power conversion circuit that is connectable to a power storage unit. The power supply system includes a control unit and a a heat transferring unit. The control unit supplies a current between the power storage unit and the power conversion circuit by performing on-off control of a switch that configures the power conversion circuit. The heat transferring unit absorbs heat that is generated in the power conversion circuit in accompaniment with the on-off control of the switch and transfers the heat to a temperature-increase target element. The control unit performs temperature-increase mode control in which the switch is on-off controlled such that an amount of heat that is generated in the power conversion circuit is increased when a temperature-increase request for the temperature-increase target element is present, compared to when the temperature-increase request is not present.

BRIEF DESCRIPTION OF THE DRAWINGS

In the accompanying drawings:

FIG. 3 is a timing chart illustrating transitions in driving states of switches and the like;

FIG. 14 is a timing chart illustrating transitions in driving states of switches and the like;

FIG. 17 is a timing chart illustrating transitions in driving states of switches and the like;

FIG. 19 is a timing chart illustrating transitions in driving states of switches and the like;

DESCRIPTION OF THE EMBODIMENTS

Figure 1:
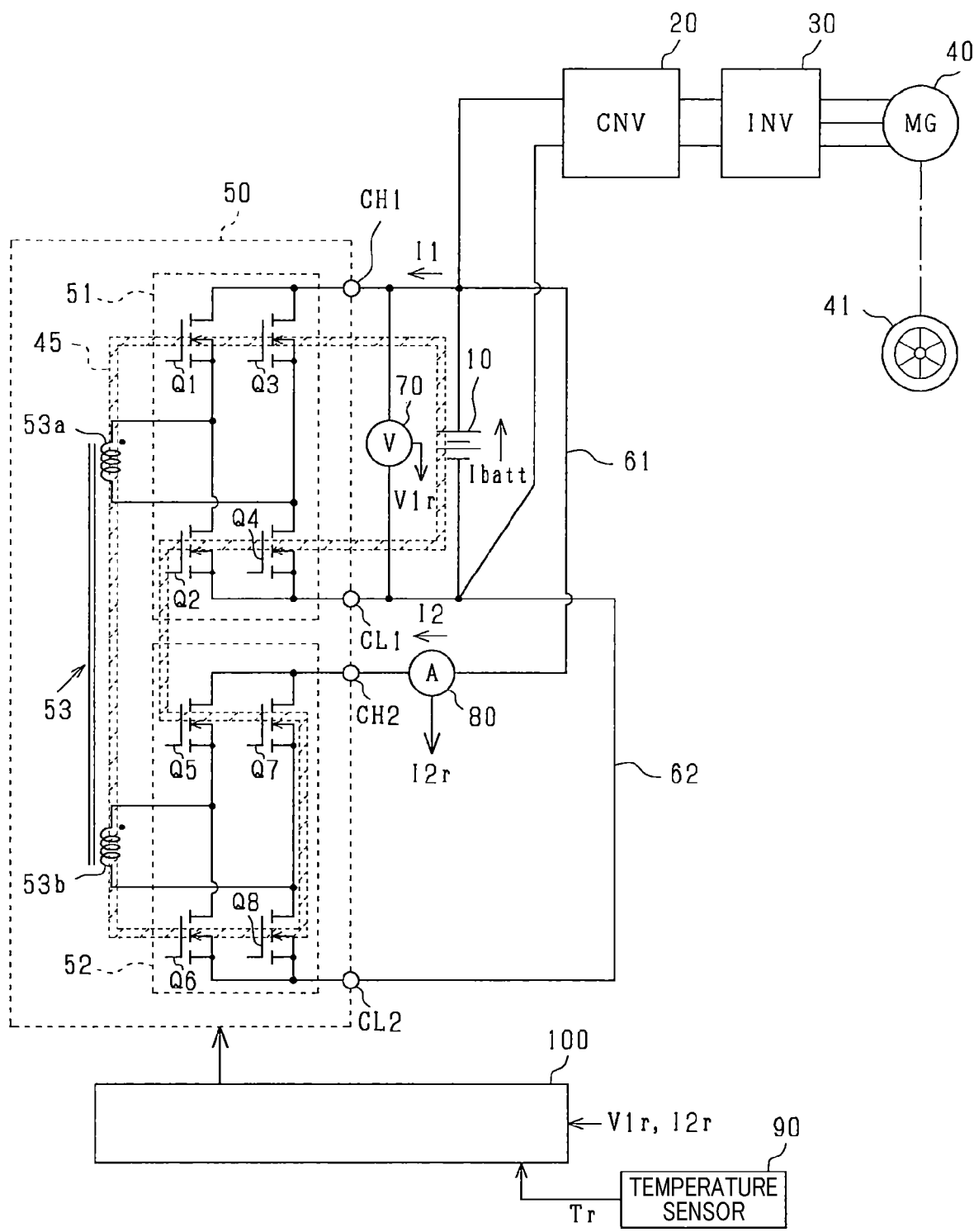
FIG. 1 is an overall configuration diagram illustrating an onboard power supply system according to a first embodiment.

The embodiments of the present disclosure relate to a power supply system that includes a power conversion circuit that is connected to a power storage unit, such as a storage battery.

Conventionally, as seen in Japanese Patent Publication No. 3451141, a power supply system that is mounted in an electric vehicle and includes a storage battery that is electrically connected to a motor that serves as a traveling power source of the electric vehicle is known. This system has a configuration in which cooling water flows near the storage battery. The cooling water is heated by an electric heater. The power supply system increases a temperature of the cooling water by controlling output of the electric heater based on a temperature of the storage battery and maintains the temperature of the storage battery within a predetermined temperature range.

When the electric heater is provided to increase the temperature of the storage battery, the power supply system may increase in size. Therefore, there is still room for improvement regarding reduction in physical size of the power supply system that increases the temperature of the storage battery. Here, the power supply system is not limited to that which includes the storage battery as a temperature-increase target element.

It is thus desired to provide a power supply system that can be reduced in size.

An exemplary embodiment of the present disclosure provides a power supply system that includes a power conversion circuit that is connectable to a power storage unit. The power supply system includes: a control unit that supplies a current between the power storage unit and the power conversion circuit by performing on-off control of a switch that configures the power conversion circuit; and a heat transferring unit that absorbs heat that is generated in the power conversion circuit in accompaniment with the on-off control of the switch and transfers the heat to a temperature-increase target element. The control unit performs temperature-increase mode control in which the switch is on-off controlled such that an amount of heat that is generated in the power conversion circuit is increased when a temperature-increase request for the temperature-increase target element is present, compared to when the temperature-increase request is not present.

In the exemplary embodiment, a temperature of a temperature-increase target element is increased using a power conversion circuit that is connected to a power storage unit. Therefore, the present disclosure provides: a control unit that supplies a current between the power storage unit and the power conversion circuit by performing on-off control of a switch that configures the power conversion circuit; and a heat transferring unit that absorbs heat that is generated in the power conversion circuit in accompaniment with the on-off control of the switch and transfers the heat to a temperature-increase target element.

Here, the control unit performs on-off control of the switch such that an amount of heat that is generated in the power conversion circuit is increased when a temperature-increase request for the temperature-increase target element is present, compared to when the temperature-increase request is not present. As a result, the temperature of the temperature-increase target element can be increased using heat that is generated in the power conversion circuit.

In the exemplary embodiment described above, a heat generation apparatus for increasing the temperature of the temperature-increase target element is unnecessary. Even when the heat generation apparatus is provided, the apparatus can be reduced in size. Therefore, as a result of the exemplary embodiment, size reduction of the power supply system can be achieved.

First Embodiment

A first embodiment actualizing a power supply system of the present disclosure will hereinafter be described with reference to the drawings. The power supply system according to the present embodiment is mounted in an electrified vehicle such as a plug-in hybrid vehicle (PHEV) or an electric vehicle (EV).

As shown in FIG. 1, the power supply system that is mountable to the vehicle includes a storage battery 10 (corresponding to a power storage unit), a direct current-to-direct current (DCDC) converter 20, an inverter 30, and a rotating electric machine 40 that serves as a traveling power source of the vehicle. The storage battery 10 is a chargeable/dischargeable secondary storage battery. For example, the storage battery 10 may be a lithium-ion storage battery or a nickel-hydrogen storage battery.

The DCDC converter 20 is connected to the storage battery 10. An armature winding of the rotating electric machine 40 is electrically connected to the DCDC converter 20 with the inverter 30 therebetween. The DCDC converter 20 provides a step-up function for stepping up a direct-current voltage that is inputted from the storage battery 10 and outputting the stepped-up direct-current voltage to the inverter 30, and a step-down function for stepping down a direct-current voltage that is inputted from the inverter 30 and outputting the stepped-down direct-current voltage to the storage battery 10.

The inverter 30 performs a power-running operation in which direct-current power that is outputted from the DCDC converter 20 is converted to alternating-current power and supplied to the armature winding of the rotating electric machine 40. As a result, a rotor of the rotating electric machine 40 is rotatably driven and a drive wheel 41 of the vehicle is rotated. Meanwhile, the inverter 30 performs a regeneration operation in which alternating-current power that is generated by the rotating electric machine 40 is converted to direct-current power and supplied to the DCDC converter 20.

The power supply system includes a power conversion circuit 50. The power conversion circuit 50 includes a first full-bridge circuit 51 (corresponding to a first conversion circuit) and a second full-bridge circuit 52 (corresponding to a second conversion circuit).

The first full-bridge circuit 51 includes first to fourth switches Q1 to Q4 (corresponding to a first conversion switch). According to the present embodiment, the first to fourth switches Q1 to Q4 are N-channel metal-oxide-semiconductor field-effect transistors (MOSFETs). A first high-potential-side terminal CH1 of the power conversion circuit 50 is connected to drains of the first switch Q1 and the third switch Q3. A drain of the second switch Q2 is connected to a source of the first switch Q1. A drain of the fourth switch Q4 is connected to a source of the third switch Q3. A first low-potential-side terminal CL1 of the power conversion circuit 50 is connected to sources of the second switch Q2 and the fourth switch Q4. The first full-bridge circuit 51 is a circuit in which either of direct-current power and alternating-current power serves as input and the other as output. Here, according to the present embodiment, the first high-potential-side terminal CH1 and the first low-potential-side terminal CL1 correspond to a first terminal.

The second full-bridge circuit 52 includes fifth to eighth switches Q5 to Q8 (corresponding to a second conversion switch). According to the present embodiment, the fifth to eighth switches Q5 to Q8 are N-channel MOSFETs. A second high-potential-side terminal CH2 of the power conversion circuit 50 is connected to drains of the fifth switch Q5 and the seventh switch Q7. A drain of the sixth switch Q6 is connected to a source of the fifth switch Q5. A drain of the eighth switch Q8 is connected to a source of the seventh switch Q7. A second low-potential-side terminal CL2 of the power conversion circuit 50 is connected to sources of the sixth switch Q6 and the eighth switch Q8. Here, according to the present embodiment, the second high-potential-side terminal CH2 and the second low-potential-side terminal CL2 correspond to a second terminal.

The power conversion circuit 50 includes a transformer 53 that has a first coil 53a and a second coil 53b. The source of the first switch Q1 and the drain of the second switch Q2 are connected to a first end of the first coil 53a. The source of the third switch Q3 and the drain of the fourth switch Q4 are connected to a second end of the first coil 53a. The source of the fifth switch Q5 and the drain of the sixth switch Q6 are connected to a first end of the second coil 53b. The source of the seventh switch Q7 and the drain of the eighth switch Q8 are connected to a second end of the second coil 53b.

The first coil 53a and the second coil 53b are magnetically coupled to each other. When a potential at the first end in relation to the second end of the first coil 53a is higher, in the second coil 53b, an induced voltage that is such that a potential at the first end thereof is higher than that at the second end is generated. Meanwhile, when a potential at the second end in relation to the first end of the first coil 53a is higher, in the second coil 53b, an induced voltage that is such that a potential at the second end thereof is higher than that at the first end is generated.

The power supply system includes a heat transferring unit 45. According to the present embodiment, with the first to eighth switches Q1 to Q8, and the transformer 53 serving as heat-exchange target elements, the heat transferring unit 45 is configured to be capable of absorbing heat that is generated in the heat-exchange target elements. The heat transferring unit 45 transfers the absorbed heat to a temperature-increase target element and increases a temperature of the temperature-increase target element. For example, the temperature-increase target element may be at least either of the rotating electric machine 40 and the storage battery 10, and in the present embodiment, is the storage battery 10.

The power supply system includes a heat transferring unit 45. According to the present embodiment, with the first to eighth switches Q1 to Q8, the transformer 53, and the storage battery 10 serving as heat-exchange target elements, the heat transferring unit 45 is configured to be capable of absorbing heat that is generated in the heat-exchange target elements. The heat transferring unit 45 transfers the absorbed heat to a temperature-increase target element and increases a temperature of the temperature-increase target element. For example, the temperature-increase target element may be at least either of the rotating electric machine 40 and the storage battery 10.

For example, the heat transferring unit 45 may include a circulation path that circulates cooling water between the heat-exchange target element and the temperature-increase target element, and increase the temperature of the temperature-increase target element by the cooling water. Here, in addition to the foregoing, for example, the heat transferring unit 45 may be that which uses a gas (air) as a cooling fluid. Furthermore, for example, the heat transferring unit 45 may not use a cooling fluid, and may be a constituent member, such as a heat sink, that is in contact with the heat-exchange target element and the temperature-increase target element.

The power supply system includes a voltage sensor 70, a current sensor 80, and a temperature sensor 90. The voltage sensor 70 detects an inter-terminal voltage of the storage battery 10. The current sensor 80 detects a current that flows to the high-potential-side electrical path 61. The temperature sensor 90 detects the temperature of the temperature-increase target element. Detection values of the voltage sensor 70, the current sensor 80, and the temperature sensor 90 are inputted to a control unit 100 that is provided in the power supply system.

The control unit 100 controls the DCDC converter 20, the inverter 30, and the switches Q1 to Q8 of the power conversion circuit 50.

Figure 2:
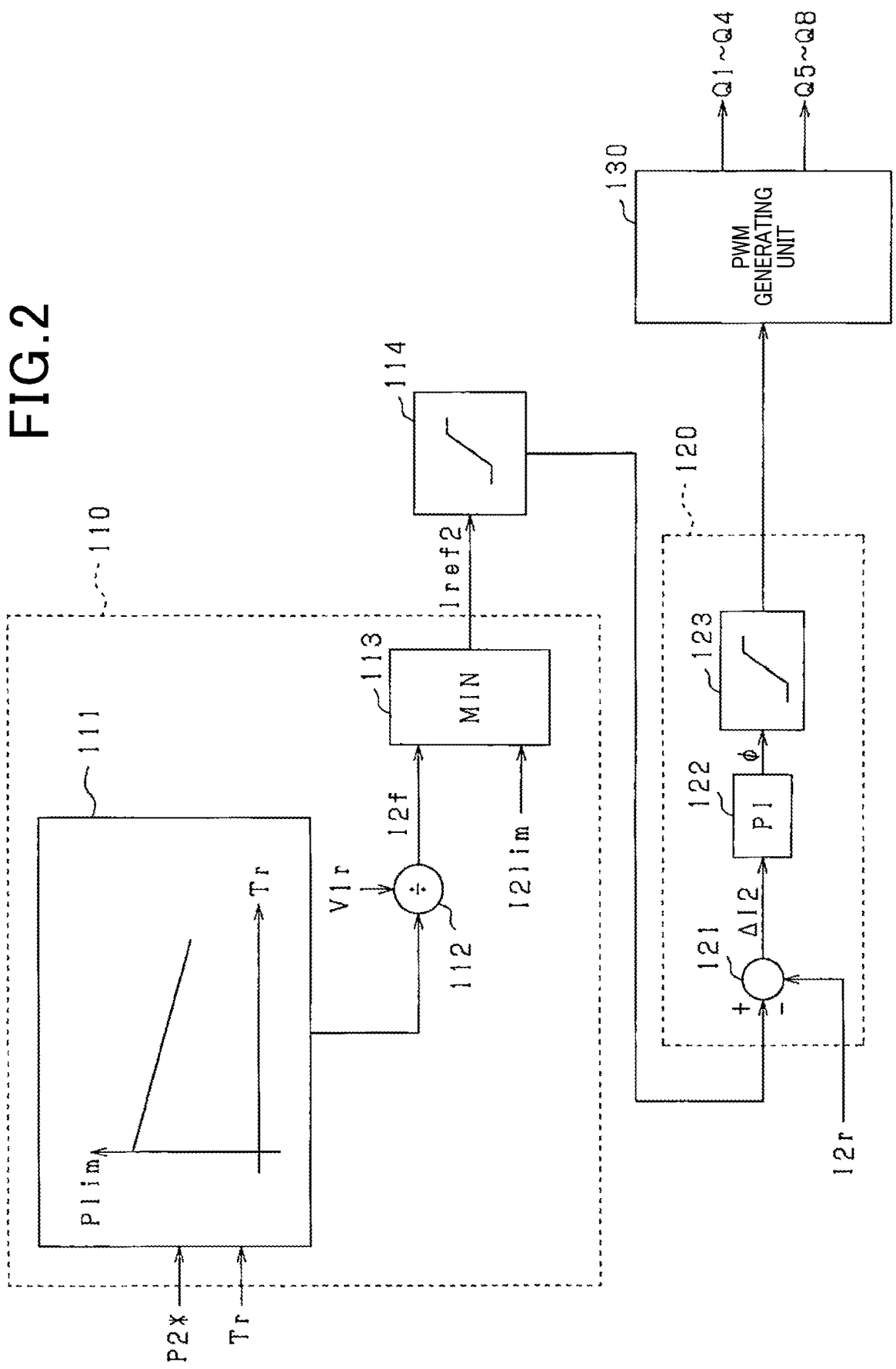
FIG. 2 is a functional block diagram illustrating processes of a control unit.

Next, temperature-increase mode control that is performed by the control unit 100 will be described with reference to FIG. 2.

The control unit 100 includes a command-current setting unit 100. The command-current setting unit 110 includes a command-power limiting unit 111, a current calculating unit 112, and a minimum-value selecting unit 113. The command-power limiting unit 111 limits inputted command power P2* to an upper limit value Plim based on a detection temperature Tr of the temperature sensor 90. According to the present embodiment, when the command power P2* is positive, control such as that in which output power of the storage battery 10 returns again to the storage battery 10 through the first full-bridge circuit 51, the transformer 53, the second full-bridge circuit 52, and the electrical paths 61 and 62 is performed. Meanwhile, when the command power P2* is negative, control such as that in which the output power of the storage battery 10 returns again to the storage battery 10 through the electrical paths 61 and 62, the second full-bridge circuit 52, the transformer 53, and the first full-bridge circuit 51 is performed.

When the inputted command power P2* exceeds the upper limit value Plim, the command-power limiting unit 111 outputs a same value as the upper limit value Plim as the command power P2*. Meanwhile, when the inputted command power P2* is equal to or less than the upper limit value Plim, the command-power limiting unit 111 outputs the inputted command power P2* as is.

The command-power limiting unit 111 sets the upper limit value Plim to be greater as the detection temperature Tr decreases. That is, because an environmental temperature surrounding the power supply system is low when the detection temperature Tr is low, cooling capability regarding the heat-exchange target elements is considered to be sufficient. In this case, even if the command power P2* is increased, it is thought that the temperatures of the power conversion circuit 50 and the like will not excessively increase.

The current calculating unit 112 calculates a command current I2f that flows to the second high-potential-side terminal CH2 by dividing the command power P2* that is outputted from the command-power limiting unit 111 by a power supply voltage V1r that is a detection voltage of the voltage sensor 70. A sign of the command current I2f being positive indicates that the current flows in a direction from the high-potential-side electrical path 61 towards the second high-potential-side terminal CH2 is indicated. The sign of the command current I2f being negative indicates that the current flows in a direction from the second high-potential-side terminal CH2 towards the high-potential-side electrical path 61.

The minimum-value selecting unit 113 selects the smaller of the command current I2f that is calculated by the current calculating unit 112 and a current limit value I2lim as a final command current Iref2. The current limit value I2lim is set to protect the power supply system from overcurrent.

An upper limit value or a lower limit value of the command current Iref2 that is outputted from the minimum-value selecting unit 113 is limited by a limiter 114.

The control unit 100 includes a current controller 120. The current controller 120 includes a current-deviation calculating unit 121, a feedback control unit 122, and a limiter 123. The current-deviation calculating unit 121 calculates a current deviation ΔI2 by subtracting a detection current I2r of the current sensor 80 from the command current Iref2 that is outputted from the limiter 114.

The feedback control unit 122 calculates a command phase φ as a manipulated variable for performing feedback control of the calculated current deviation ΔI2 to 0. According to the present embodiment, proportional-integral control is used as the feedback control. The command phase φ will be described hereafter.

Here, the feedback control that is used in the feedback control unit 122 is not limited to proportional-integral control and, for example, may be proportional-integral-differential control.

An upper limit value or a lower limit value of the command phase φ that is calculated by the feedback control unit 122 is limited by the limiter 123. The command phase φ is inputted to a pulse width modulation (PWM) generating unit 130.

Figure 3:
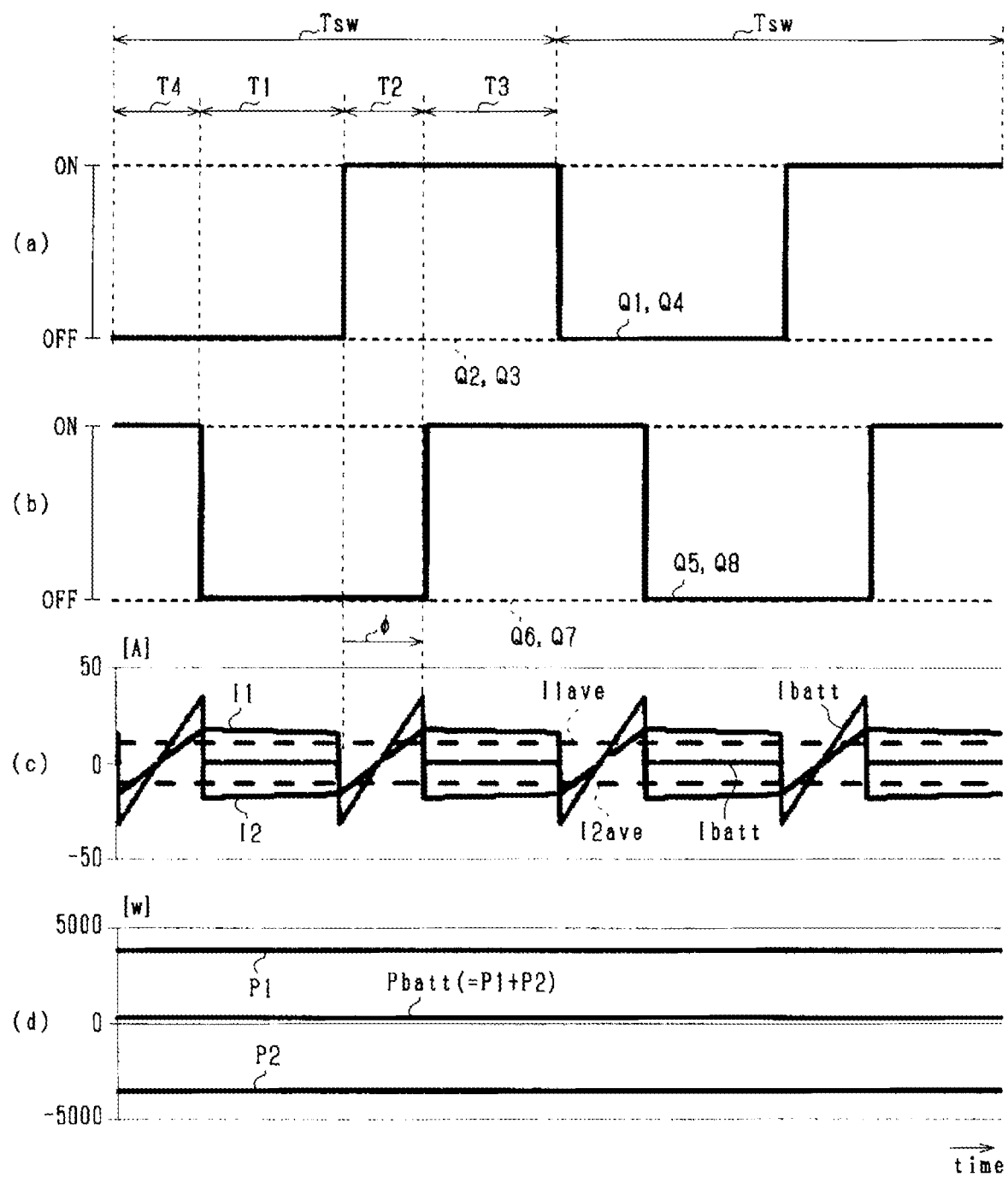

The PWM generating unit 130 generates drive signals of the switches Q1 to Q8 based on the command phase φ, and outputs the drive signals to gates of the switches Q1 to Q8. A driving mode of the switches Q1 to Q8 will be described below with reference to FIG. 3. FIG. 3(a) shows transitions in driving states of the first to fourth switches Q1 to Q4. FIG. 3(b) shows transitions in driving states of the fifth to eighth switches Q5 to Q8.

A timing for switching to an on-state and a timing for switching to an off-state are synchronized between the first switch Q1 and the fourth switch Q4. In addition, the timing for switching to the on-state and the timing for switching to the off-state are synchronized between the second switch Q2 and the third switch Q3. A set of the first and fourth switches Q1 and Q4, and a set of the second and third switches Q2 and Q3 are alternately turned on.

The timing for switching to the on-state and the timing for switching to the off-state are synchronized between the fifth switch Q5 and the eighth switch Q8. In addition, the timing for switching to the on-state and the timing for switching to the off-state are synchronized between the sixth switch Q6 and the seventh switch Q7. A set of the fifth and eighth switches Q5 and Q8, and a set of the sixth and seventh switches Q6 and Q7 are alternately turned on.

Single switching cycles Tsw of the switches Q1 to Q8 are the same as one another. A phase difference between the timing for switching to the on-state of the first and fourth switches Q1 and Q4, and the timing for switching to the on-state of the sixth and seventh switches Q6 and Q7 is the command phase φ. According to the present embodiment, the command phase φ is negative when the timing for switching to the on-state of the sixth and seventh switches Q6 and Q7 is later than the timing for switching to the on-state of the first and fourth switches Q1 and Q4, and positive when the timing for switching to the on-state of the sixth and seventh switches Q6 and Q7 is earlier than the timing for switching to the on-state of the first and fourth switches Q1 and Q4.

Here, in FIG. 3, when the single switching cycle Tsw is 360°, an on-period of the switches Q1 to Q8 is 180°. However, this is not limited thereto. The on-period may be greater than 0° and less than 180°.

According to the present embodiment, first to fourth periods T1 to T4 appear in the single switching cycle Tsw. The first period T1 is a period in which the second, third, sixth, and seventh switches Q2, Q3, Q6, and Q7 are turned on, and the first, fourth, fifth, and eighth switches Q1, Q4, Q5, and Q8 are turned off. The second period T2 is a period in which the first, fourth, sixth, and seventh switches Q1, Q4, Q6, and Q7 are turned on, and the second, third, fifth, and eighth switches Q2, Q3, Q5, and Q8 are turned off.

The third period T3 is a period in which the first, fourth, fifth, and eighth switches Q1, Q4, Q5, and Q8 are turned on, and the second, third, sixth, and seventh switches Q2, Q3, Q6, and Q7 are turned off. The fourth period T4 is a period in which the second, third, fifth, and eighth switches Q2, Q3, Q5, and Q8 are turned on, and the first, fourth, sixth, and seventh switches Q1, Q4, Q6, and Q7 are turned off.

Hereafter, the periods T1 to T4 will be described with reference to FIG. 3 to FIG. 7. Here, FIG. 3(c) shows transitions in a first current I1, a second current I2, and a battery current Ibatt that is a current that flows to the storage battery 10. The first current I1 is a current that flows to the first high-potential-side terminal CH1. The second current I2 is a current that flows to the second high-potential-side terminal CH2. The first current I1 is positive when the first current I1 flows in a direction from the high-potential-side electrical path 61 towards the first high-potential-side terminal CH1. The second current I2 is positive when the second current I2 flows in a direction from the high-potential-side electrical path 61 towards the second high-potential-side terminal CH2. The battery current Ibatt is positive when the battery current Ibatt flows in a direction from the negative electrode terminal towards the positive electrode terminal of the storage battery 10. Here, in FIG. 3(c), a time average value I1ave of the first current I1 and a time average value I2ave of the second current I2 are indicated by broken lines.

FIG. 3(d) shows transitions in first power P1, second power P2, and battery power Pbatt. The first power P1 is a time average value of power that is supplied from the storage battery 10 to the first full-bridge circuit 51. The second power P2 is a time average value of power that is supplied from the second full-bridge circuit 53 to the storage battery 10 through the electrical paths 61 and 62. The battery power Pbatt is a total value of the first power P1 and the second power P2.

Figure 4:
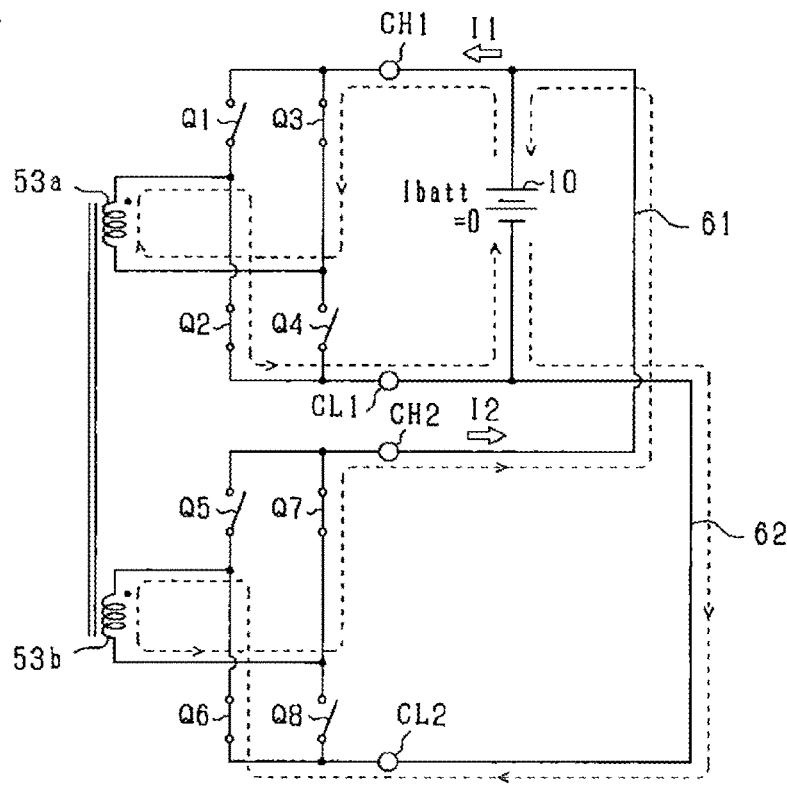
FIG. 4 is a diagram illustrating a current flow path in a first period.

First, the first period T1 will be described with reference to FIG. 4.

In the first period T1, a closed circuit that includes the storage battery 10, the first high-potential-side terminal CH1, the third switch Q3, the first coil 53a, the second switch Q2, and the first low-potential-side terminal CL1 is formed. As a result, the first current I1 becomes a positive fixed value.

Meanwhile, in the first period T1, a closed circuit that includes the second coil 53b, the seventh switch Q7, the second high-potential-side terminal CH2, the high-potential-side electrical path 61, the storage battery 10, the low-potential-side electrical path 62, the second low-potential-side terminal CL2, and the sixth switch Q6 is formed. As a result, the second current I2 becomes negative. An absolute value of the second current I2 is the same as an absolute value of the first current I1. Therefore, the battery current Ibatt becomes 0.

Figure 5:
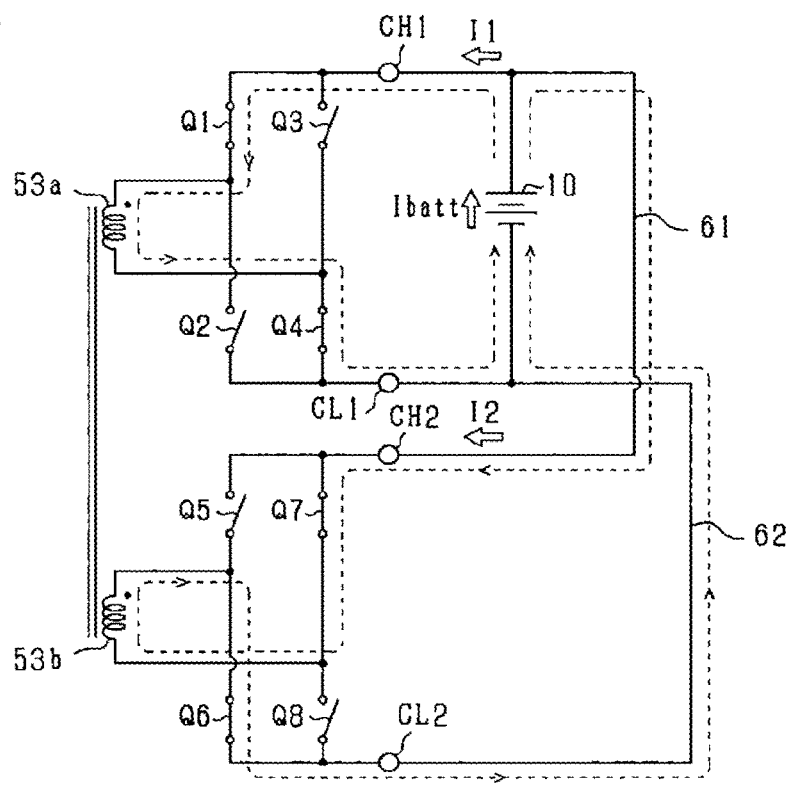
FIG. 5 is a diagram illustrating a current flow path in a second period.

Next, the second period T2 will be described with reference to FIG. 5. Here, FIG. 5 shows a current flow path of a latter half of the second period T2.

When the first and fourth switches Q1 and Q4 are switched to the on-state, and the second and third switches Q2 and Q3 are switched to the off-state, as a result of leakage inductance of the transformer 53, the current attempts to flow to the first coil 53a in a same direction as a current flow direction in which the current flows to the first coil 53a in the first period T1. Because this current flows to the first high-potential-side terminal CH1 through a body diode of the first switch Q1, the first current I1 becomes a negative value. Subsequently, the first current I1 gradually increases and becomes a positive value. In this case, as shown in FIG. 5, the current flows to a closed circuit that includes the storage battery 10, the first high-potential-side terminal CH1, the first switch Q1, the first coil 53a, the fourth switch Q4, and the first low-potential-side terminal CL1.

Meanwhile, a closed circuit that includes the second coil 53b, the sixth switch Q6, the second low-potential-side terminal CL2, the low-potential-side electrical path 62, the storage battery 10, the high-potential-side electrical path 61, the second high-potential-side terminal CH2, and the seventh switch Q7 is formed. In the second period T2, the second current I2 is the same value as the first current I1. As a result, in the second period T2, the battery current Ibatt gradually increases from a negative value and subsequently becomes a positive value.

Figure 6:
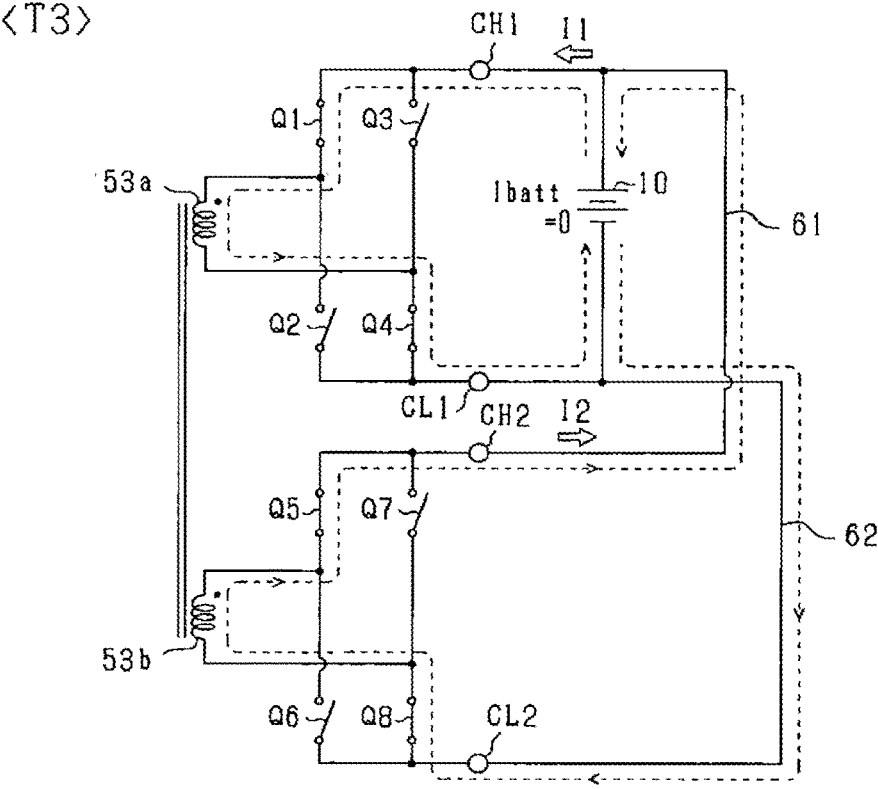
FIG. 6 is a diagram illustrating a current flow path in a third period.

Next, the third period T3 will be described with reference to FIG. 6.

When the fifth and eighth switches Q5 and Q8 are switched to the on-state, and the sixth and seventh switches Q6 and Q7 are switched to the off-state, the first current I1 becomes a positive fixed value.

Meanwhile, a closed circuit that includes the second coil 53b, the fifth switch Q5, the second high-potential-side terminal CH2, the high-potential-side electrical path 61, the storage battery 10, the low-potential-side electrical path 62, the second low-potential-side terminal CL2, and the eighth switch Q8 is formed. As a result, the second current I2 becomes negative. The absolute value of the second current I2 is the same as the absolute value of the first current I1. Therefore, the battery current Ibatt becomes 0.

Figure 7:
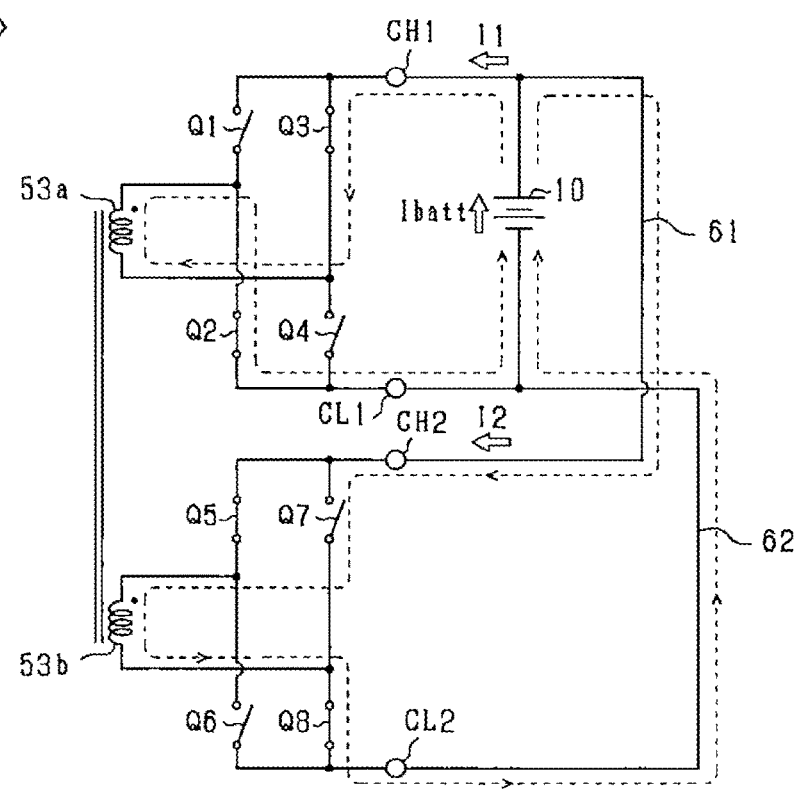
FIG. 7 is a diagram illustrating a current flow path in a fourth period.

Next, the fourth period T4 will be described with reference to FIG. 7. Here, FIG. 7 shows a current flow path of a latter half of the fourth period T4.

When the second and third switches Q2 and Q3 are switched to the on-state, and the first and fourth switches Q1 and Q4 are switched to the off-state, the current flows to a closed circuit that includes the storage battery 10, the first high-potential-side terminal CH1, the third switch Q3, the first coil 53a, the second switch Q2, and the first low-potential-side terminal CL1. The transitions in the first current I1, the second current I2, and the battery current Ibatt in the fourth period T4 are similar to the transitions in the second period T2.

As shown in FIG. 3(d), the battery power Pbatt is a positive value. This indicates that, in the first to fourth periods T1 to T4, power loss occurs in the power conversion circuit 50, the storage battery 10, and the like. This power loss mainly occurs in the storage battery 10, the switches Q1 to Q8, and the transformer 53. Heat that is generated is absorbed by the heat transferring unit 45 and used to increase the temperature of the temperature-increase target element.

Figure 8:
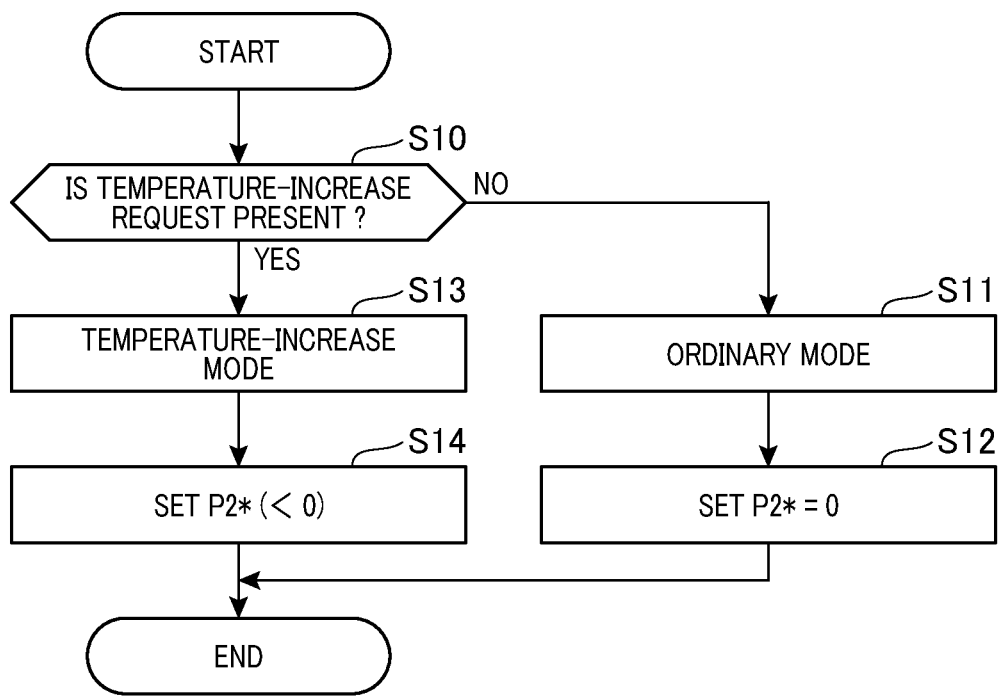
FIG. 8 is a flowchart illustrating processing steps in temperature-increase mode control.

FIG. 8 shows steps in a process performed by the control unit 100. For example, this process may be repeatedly performed at a predetermine control cycle.

At step S10, whether a temperature increase request is present is determined. Specifically, for example, the temperature increase request may be determined to be present when an environmental temperature is determined to be equal to or less than a predetermined temperature. For example, the environmental temperature may be a temperature, such as the detection temperature Tr of the temperature sensor 90, a temperature of the heat transferring unit 45, or an ambient temperature of the power supply system, that enables determination regarding whether a state is such that the temperature-increase mode control should be performed.

When a negative determination is made at step S10, the control unit 100 proceeds to step S11 and performs ordinary mode control. In this case, at step S12, the command power P2* is set to 0. Therefore, driving of the switches Q5 to Q8 in the second full-bridge circuit 52 is stopped.

Meanwhile, when an affirmative determination is made at step S10, the control unit 100 proceeds to step S13 and performs the temperature-increase mode control. In this case, at step S14, the command power P2* is set to a value that is less than 0. As a result, an amount of heat that is generated in the power conversion circuit 50 and the like increases from that when the ordinary mode control is performed.

According to the present embodiment described in detail above, the following effects can be achieved.

When the temperature increase request for the temperature-increase target element is present, the control unit 100 performs the temperature-increase mode control. In this case, the amount of heat that is generated in the power conversion circuit 50 and the like increases compared to that when the temperature increase request is not present. Therefore, the temperature of the temperature-increase target element can be increased through use of the heat that is generated in the power conversion circuit 50 and the like. Consequently, according to the present embodiment, a heat generation apparatus for increasing the temperature of the temperature-increase target element is not required to be newly provided in the power supply system. As a result, size reduction of the power supply system can be achieved.

The temperature-increase mode control is performed using the power conversion circuit 50, excluding the inverter 30 that is connected to the rotating electric machine 40 that serves as the traveling power source. Therefore, occurrence of situations in which torque is generated in the rotating electric machine 40 while the vehicle is stopped and the vehicle is moved, or torque varies while the vehicle is traveling can be prevented as a result of the temperature-increase mode control being performed.

Variation Examples According to the First Embodiment

When the temperature-increase mode control is performed, a sign of the command power P2* may be switched at every fixed cycle.

In the temperature-increase mode control, power may be circulated in a direction from the storage battery 10 towards the second full-bridge circuit 52 through the electrical paths 61 and 62, rather than a direction from the storage battery 10 towards the first full-bridge circuit 51. This can be actualized by the command power P2* being set to a positive value.

Second Embodiment

Figure 9:
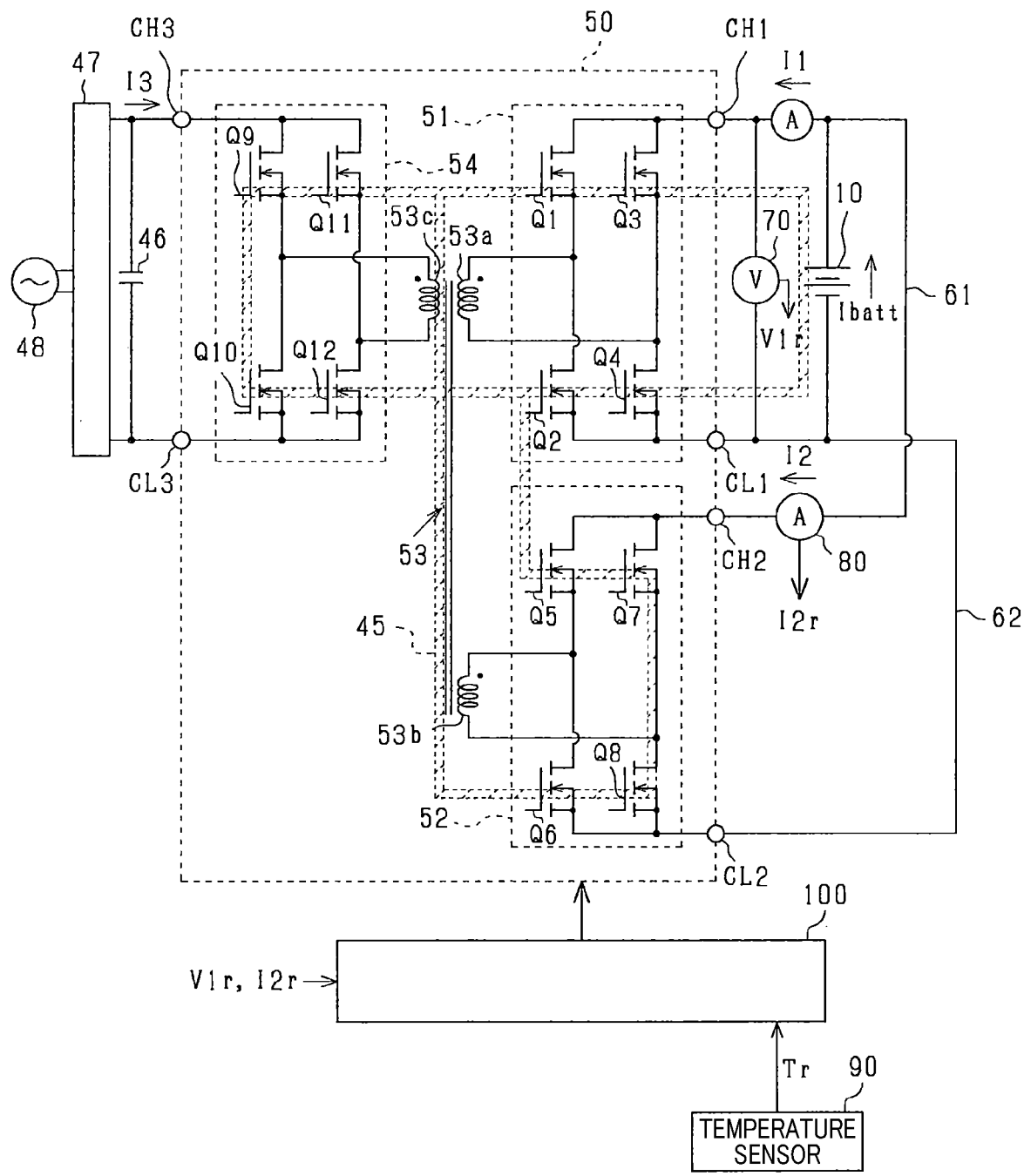
FIG. 9 is a configuration diagram illustrating a power supply system according to a second embodiment.

A second embodiment will be described below with reference to the drawings, mainly focusing on differences with the first embodiment. According to the present embodiment, as shown in FIG. 9, the power conversion circuit 50 includes a third full-bridge circuit 54 (corresponding to a third conversion circuit). Here, in FIG. 9, configurations that are identical to the configurations shown in FIG. 1 above are given the same reference numbers for convenience. In addition, in FIG. 9, illustration of the DCDC converter 20 and the like is omitted.

The third full-bridge circuit 54 includes ninth to twelfth switches Q9 to Q12 (corresponding to a third conversion switch). According to the present embodiment, the ninth to twelfth switches Q9 to Q12 are N-channel MOSFETs. A third high-potential-side terminal CH3 of the power conversion circuit 50 is connected to drains of the ninth switch Q9 and the eleventh switch Q11. A drain of the tenth switch Q10 is connected to a source of the ninth switch Q9. A drain of the twelfth switch Q12 is connected to a source of the eleventh switch Q11. A third low-potential-side terminal CL3 of the power conversion circuit 50 is connected to sources of the tenth switch Q10 and the twelfth switch Q12. Here, according to the present embodiment, the third high-potential-side terminal CH3 and the third low-potential-side terminal CL3 correspond to a third terminal.

The transformer 53 has a third coil 53c. The source of the ninth switch Q9 and the drain of the tenth switch Q10 are connected to a first end of the third coil 53c. The source of the eleventh switch Q11 and the drain of the twelfth switch Q12 are connected to a second end of the third coil 53c.

The first coil 53a, the second coil 53b, and the third coil 53c are magnetically coupled to one other. When the potential at the first end in relation to the second end of the first coil 53a is higher, in the third coil 53c, an induced voltage that is such that a potential at the first end thereof is higher than that at the second end is generated. Meanwhile, when the potential at the second end in relation to the first end of the first coil 53a is higher, in the third coil 53c, an induced voltage that is such that a potential at the second end thereof is higher than that at the first end is generated.

The heat transferring unit 45 further sets the ninth to twelfth switches Q9 to Q12 as the heat-exchange target elements.

The power supply system includes a capacitor 46 and a converter 47. The capacitor 46 connects the third high-potential-side terminal CH3 and the third low-potential-side terminal CL3. The converter 47 provides a function for improving a power factor while converting alternating-current power that is supplied from an external power supply 48 to direct-current power. Output power from the external power supply 48 is supplied to the storage battery 10 through the converter 47, the third full-bridge circuit 54, the transformer 53, and at least either of the first full-bridge circuit 51 and the second full-bridge circuit 52. As a result, the storage battery 10 is charged.

Figure 10:
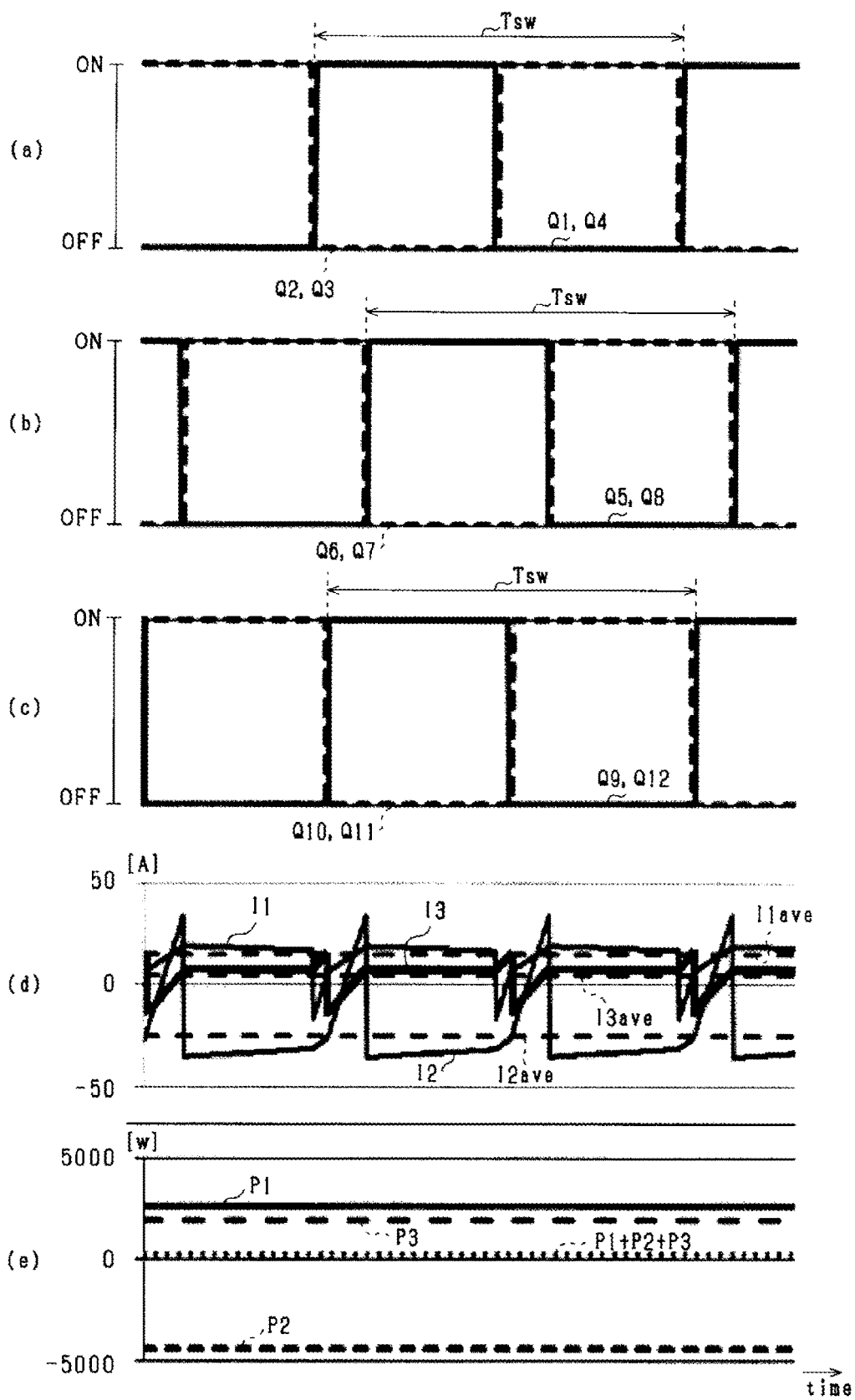
FIG. 10 is a timing chart illustrating transitions in driving states of switches and the like when temperature-increase mode control is performed.

As shown in FIG. 10(c), the control unit 100 performs on-off control of the ninth to twelfth switches Q9 to Q12.

The timing for switching to the on-state and the timing for switching to the off-state are synchronized between the ninth switch Q9 and the twelfth switch Q12. In addition, the timing for switching to the on-state and the timing for switching to the off-state are synchronized between the tenth switch Q10 and the eleventh switch Q11. A set of the ninth and twelfth switches Q9 and Q12, and a set of the tenth and eleventh switches Q10 and Q11 are alternately turned on. According to the present embodiment, single switching cycles of the ninth to twelfth switches Q9 to Q12 are the same as the single switching cycles Tsw of the first to eighth switches Q1 to Q8.

As a result of a phase difference of the timing for switching to the on-state of the ninth and twelfth switches Q9 and Q12 in relation to the timing for switching to the on-state of the first and fourth switches Q1 and Q4 being adjusted, charging power from the external power supply 48 to the storage battery 10 can be adjusted.

Here, FIG. 10(d) shows transitions in the first current I1, the second current I2, the battery current Ibatt, and a third current I3. The third current I3 is a current that flows to the third high-potential-side terminal CH3. The third current I3 is positive when the third current I3 flows in a direction from the converter 47 towards the third high-potential-side terminal CH3. Here, in FIG. 10(d), a time average value I3ave of the third current I3 is indicated by a broken line. Here, when charging of the storage battery 10 using output power from the externa power supply 48 is performed, a command value of the charging power is positive (that is, the third current I3 is positive).

FIG. 10(e) shows transitions in the first power P1, the second power P2, third power P3, and total power (=P1+ P2+P3). The third power P3 is a time average value of the charging power from the external power supply 48 to the storage battery 10.

As shown in FIG. 10(e), according to the present embodiment, the total power is a positive value. Therefore, the temperature-increase mode control can be performed while charging from the external power supply 48 to the storage battery 10 is being performed.

Figure 11:
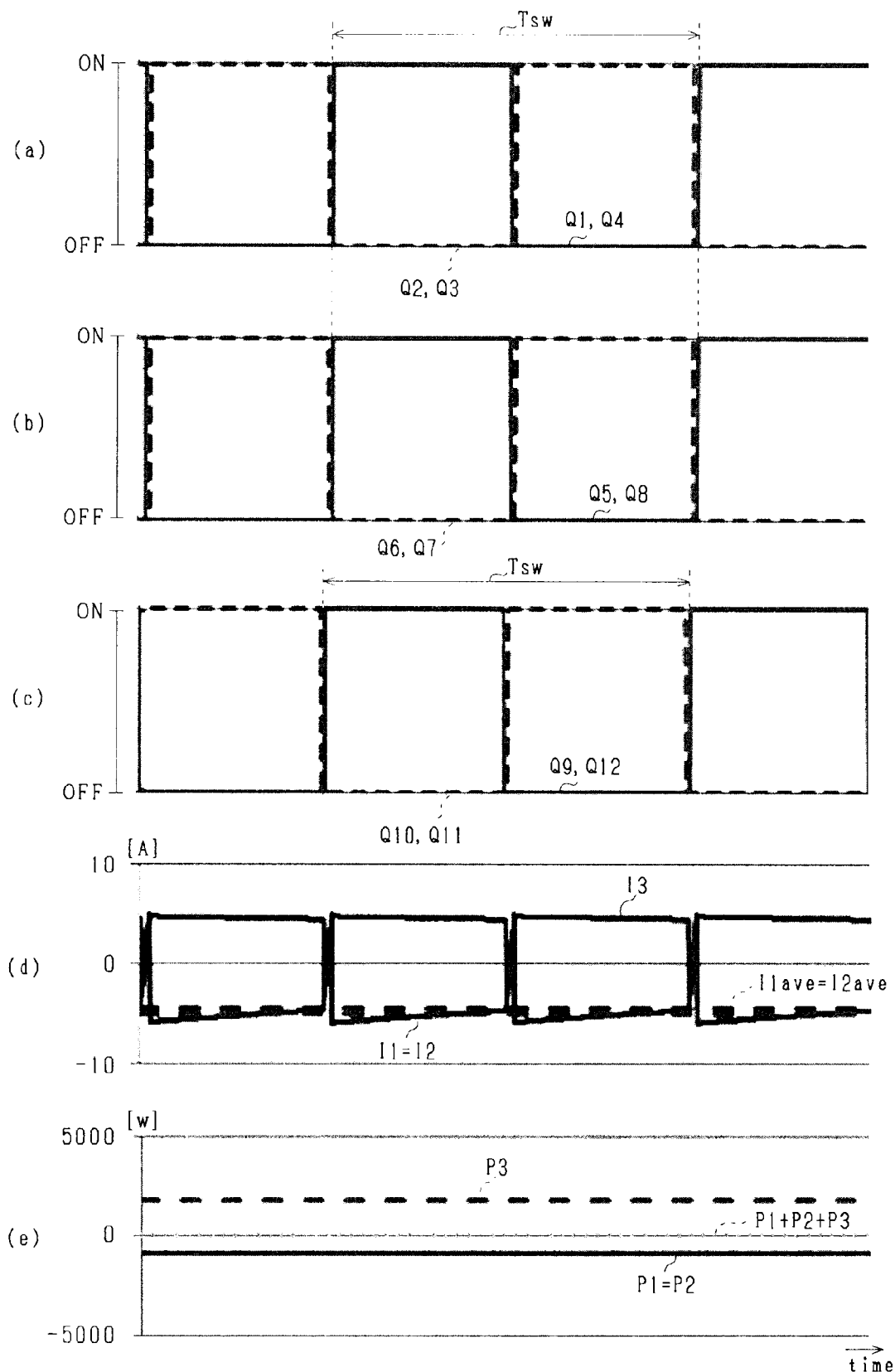
FIG. 11 is a timing chart illustrating transitions in driving states of switches and the like when temperature-increase mode control is not performed.

Here, FIG. 11 shows a case in which the temperature-increase mode control is not performed, and only charging from the external power supply 48 to the storage battery 10 is performed. In the example shown in FIG. 11, the output power of the external power supply 48 is supplied to the storage battery 10 by being received by both the first full-bridge circuit 51 and the second full-bridge circuit 52. Because the temperature-increase mode control is not performed, only loss due to charging occurs. The total power is closer to 0 compared to that in FIG. 10(e).

According to the present embodiment described above, the temperature-increase mode control can be performed without being affected by an operation for charging the storage battery 10 from the external power supply 48 through the third full-bridge circuit 54.

Third Embodiment

Figure 12:
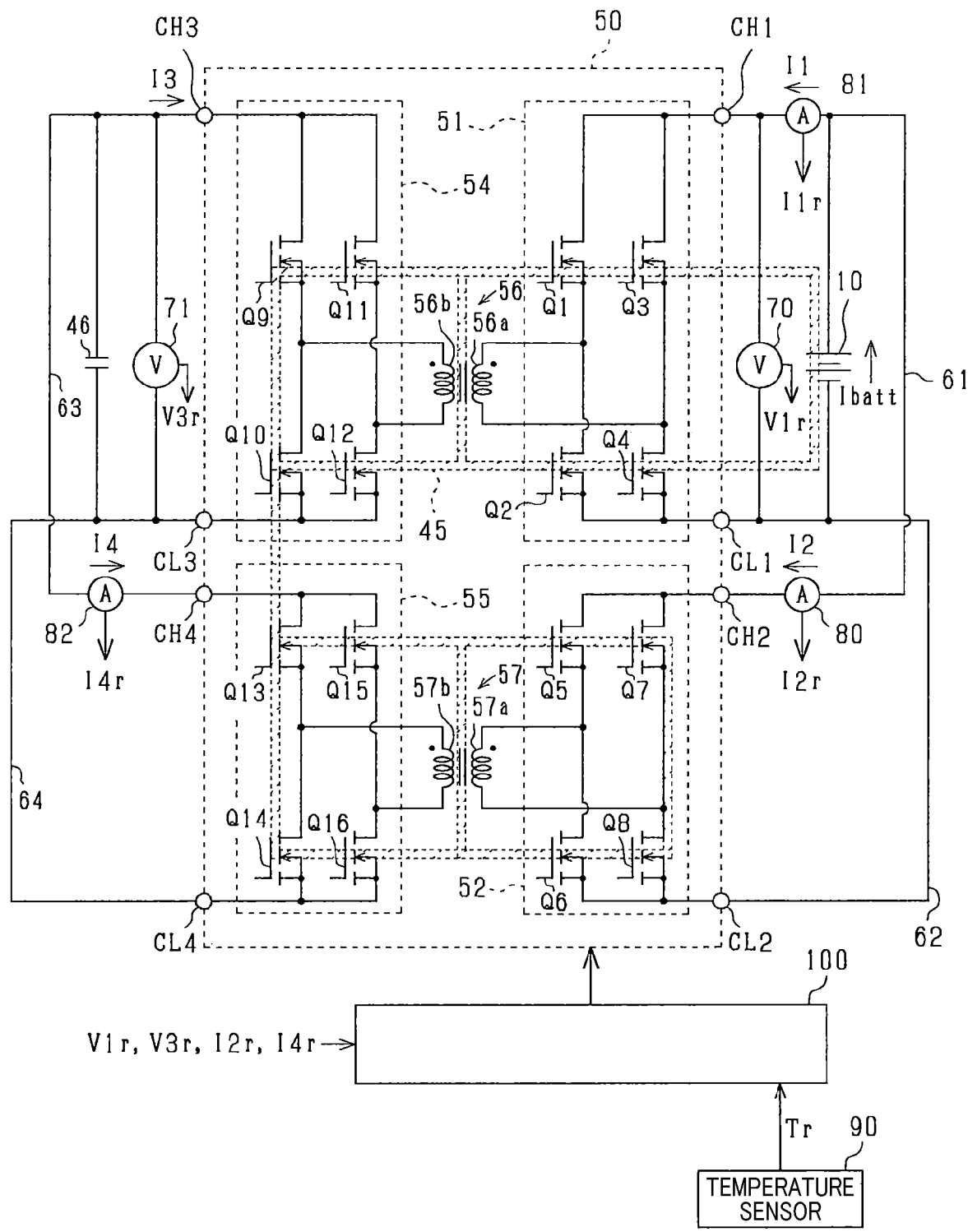
FIG. 12 is a configuration diagram illustrating a power supply system according to a third embodiment.

A third embodiment will be described below with reference to the drawings, mainly focusing on differences with the second embodiment. According to the present embodiment, as shown in FIG. 12, the power conversion circuit 50 includes a fourth full-bridge circuit 55 (corresponding to a fourth conversion circuit). Here, in FIG. 12, configurations that are identical or correspond to the configurations shown in FIG. 9 above are given the same reference numbers for convenience.

The fourth full-bridge circuit 55 includes thirteenth to sixteenth switches Q13 to Q16 (corresponding to a fourth conversion switch). According to the present embodiment, the thirteenth to sixteenth switches Q13 to Q16 are N-channel MOSFETs. A fourth high-potential-side terminal CH4 of the power conversion circuit 50 is connected to drains of the thirteenth switch Q13 and the fifteenth switch Q15. A drain of the fourteenth switch Q14 is connected to a source of the thirteenth switch Q13. A drain of the sixteenth switch Q16 is connected to a source of the fifteenth switch Q15. A fourth low-potential-side terminal CL4 of the power conversion circuit 50 is connected to sources of the fourteenth switch 14 and the sixteenth switch Q16. Here, according to the present embodiment, the fourth high-potential-side terminal CH4 and the fourth low-potential-side terminal CL4 correspond to a fourth terminal.

The power conversion circuit 50 includes a first transformer 56 and a second transformer 57. The first transformer 56 has a first coil 56a and a second coil 56b. The source of the first switch Q1 and the drain of the second switch Q2 are connected to a first end of the first coil 56a. The source of the third switch Q3 and the drain of the fourth switch Q4 are connected to a second end of the first coil 56a. The source of the ninth switch Q9 and the drain of the tenth switch Q10 are connected to a first end of the second coil 56b. The source of the eleventh switch Q11 and the drain of the twelfth switch Q12 are connected to a second end of the second coil 56b.

The first coil 56a and the second coil 56b are magnetically coupled to each other. When a potential at the first end in relation to the second end of the first coil 56a is higher, in the second coil 56b, an induced voltage that is such that a potential at the first end thereof is higher than that at the second end is generated.

The second transformer 57 has a third coil 57a and a fourth coil 57b. The source of the fifth switch Q5 and the drain of the sixth switch Q6 are connected to a first end of the third coil 57a. The source of the seventh switch Q7 and the drain of the eighth switch Q8 are connected to a second end of the third coil 57a. The source of the thirteenth switch Q13 and the drain of the fourteenth switch Q14 are connected to a first end of the fourth coil 57b. The source of the fifteenth switch Q15 and the drain of the sixteenth switch Q16 are connected to a second end of the fourth coil 57b.

The third coil 57a and the fourth coil 57b are magnetically coupled to each other. When a potential at the first end in relation to the second end of the third coil 57a is higher, in the fourth coil 57b, an induced voltage that is such that a potential at the first end thereof is higher than that at the second end is generated.

According to the present embodiment, the high-potential-side electrical path 61 is referred to as a first high-potential-side electrical path. The low-potential-side electrical path 62 is referred to as a first low-potential-side electrical path. The power conversion circuit 50 includes a second high-potential-side electrical path 63 and a second low-potential-side electrical path 64. The second high-potential-side electrical path 63 connects the third high-potential-side terminal CH3 and the fourth high-potential-side terminal CH4. The second low-potential-side electrical path 64 connects the third low-potential-side terminal CL3 and the fourth low-potential-side terminal CL4. The second high-potential-side electrical path 63 and the second low-potential-side electrical path 64 are connected by the capacitor 46.

Here, according to the present embodiment, the first high-potential-side electrical path 61 and the first low-potential-side electrical path 62 correspond to a first electrical path. The second high-potential-side electrical path 63 and the second low-potential-side electrical path 64 correspond to a second electrical path.

The heat transferring unit further sets the thirteenth to sixteenth switches Q13 to Q16, the first transformer 56, and the second transformer 57 as the heat-exchange target elements.

According to the present embodiment, the voltage sensor 70 is referred to as a first voltage sensor 70. The current sensor 80 is referred to as a first current sensor 80. The power supply system includes a second voltage sensor 71, a second current sensor 81, and a third current sensor 82. The second voltage sensor 71 detects an inter-terminal voltage of the capacitor 46. The second current sensor 81 detects a current that flows to the first high-potential-side terminal CH1. The third current sensor 82 detects a current that flows to the second high-potential-side electrical path 63. Detection values of the second voltage sensor 71, the second current sensor 81, and the third current sensor 82 are inputted to the control unit 100.

Figure 13:
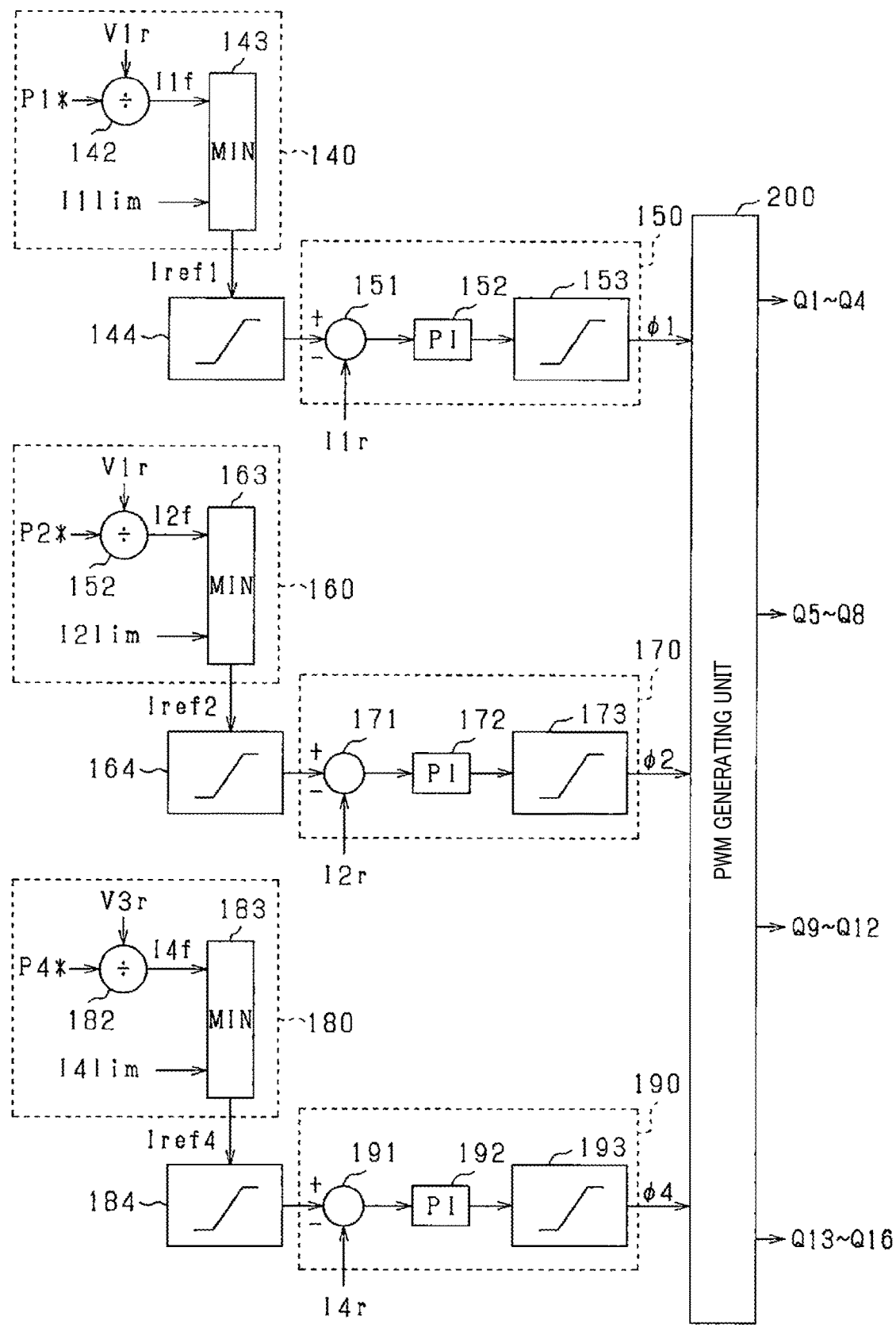
FIG. 13 is a functional block diagram illustrating processes of a control unit.

Next, the temperature-increase mode control performed by the control unit 100 will be described with reference to FIG. 13. Here, in FIG. 13, illustration of the command-power limiting unit 111 is omitted.

Figure 14:
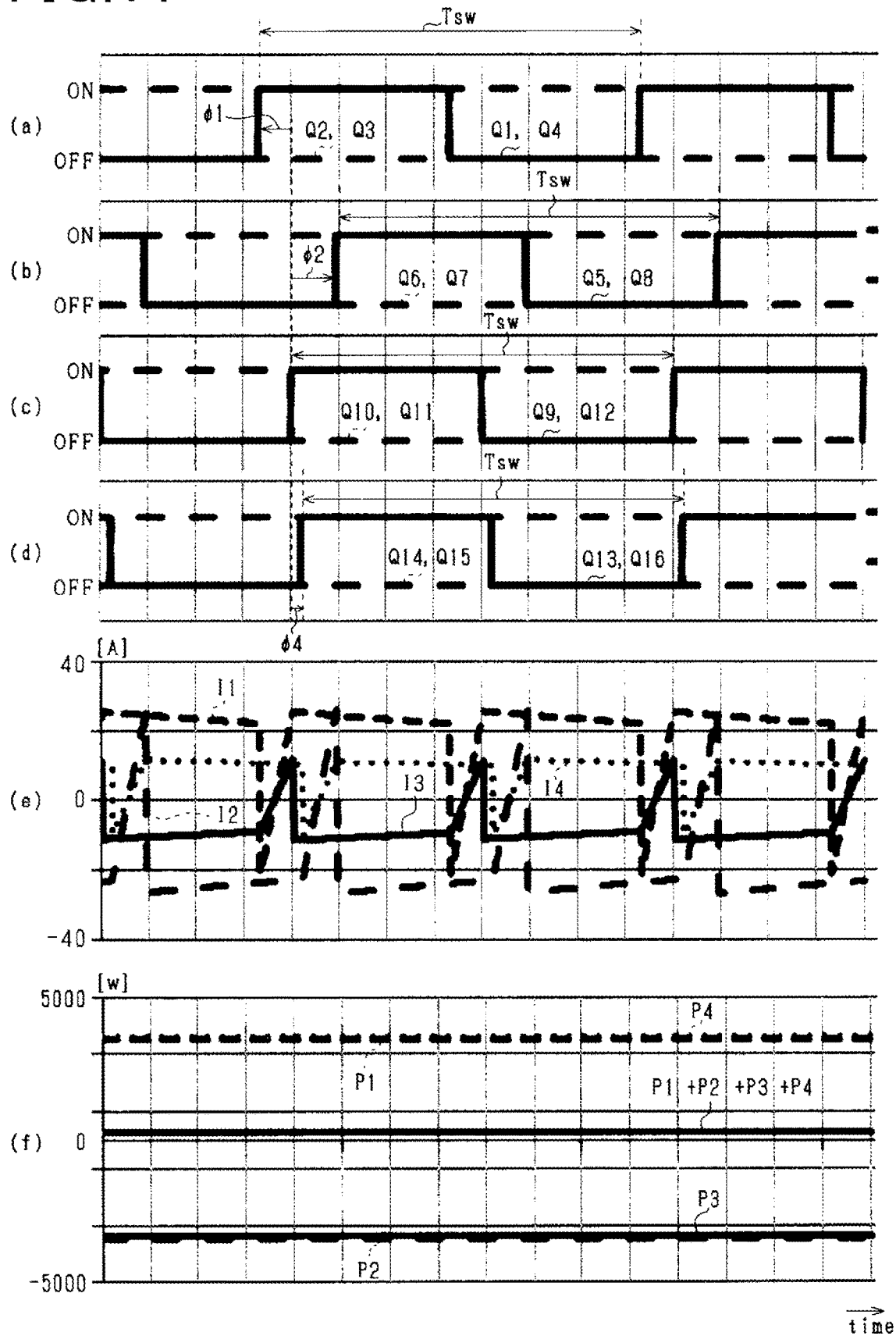

The control unit 100 calculates a first command phase $\varphi 1$, a second command phase $\varphi 2$, and a fourth command phase $\varphi 4$. The command phases $\varphi 1$, $\varphi 2$, and $\varphi 4$ will be described with reference to FIG. 14. FIG. 14(a) to (c) correspond to FIG. 10(a) to (c) above. FIG. 14(d) shows transitions in driving states of the thirteenth to sixteenth switches Q13 to Q16.

The timing for switching to the on-state and the timing for switching to the off-state are synchronized between the thirteenth switch Q13 and the sixteenth switch Q16. In addition, the timing for switching to the on-state and the timing for switching to the off-state are synchronized between the fourteenth switch Q14 and the fifteenth switch Q15. A set of the thirteenth and sixteenth switches Q13 and Q16, and a set of the fourteenth and fifteenth switches Q14 and Q15 are alternately turned on. According to the present embodiment, the single switching cycles Tsw of the switches Q1 to Q16 are the same as one another.

The first command phase $\varphi 1$ is a command value of a phase difference between the timing for switching to the on-state of the ninth and twelfth switches Q9 and Q12, and the timing for switching to the on-state of the first and fourth switches Q1 and Q4. The first command phase $\varphi 1$ is negative when the timing for switching to the on-state of the first and fourth switches Q1 and Q4 is later than the timing for switching to the on-state of the ninth and twelfth switches Q9 and Q12, and positive when the timing for switching to the on-state of the first and fourth switches Q1 and Q4 is earlier than the timing for switching to the on-state of the ninth and twelfth switches Q9 and Q12.

The second command phase $\varphi 2$ is a command value of a phase difference between the timing for switching to the on-state of the ninth and twelfth switches Q9 and Q12, and the timing for switching to the on-state of the fifth and eighth switches Q5 and Q8. The fourth command phase $\varphi 4$ is a command value of a phase difference between the timing for switching to the on-state of the ninth and twelfth switches Q9 and Q12, and the timing for switching to the on-state of the thirteenth and sixteenth switches Q13 and Q16. Definitions of the signs of the second and fourth command phases $\varphi 2$ and $\varphi 4$ are similar to the definitions of the signs of the first command phase $\varphi 1$.

Returning to the description with reference to FIG. 3, the control unit 100 includes a first command-current setting unit 140 and a first current controller 150 as a configuration for calculating the first command phase $\varphi 1$.

The first command-current setting unit 140 includes a first current calculating unit 142 and a first minimum-value selecting unit 143. The first current calculating unit 142 calculates a first command current I1f that flows to the first high-potential-side terminal CH1 by dividing inputted first command power P1* by a first power supply voltage V1r that is a detection voltage of the first voltage sensor 70. The first command power P1* is a command value of power that is transmitted between the first full-bridge circuit 51 and the first transformer 56. When the first command power P1* is positive, power is transmitted from the first full-bridge circuit 51 to the first transformer 56.

The first minimum-value selecting unit 143 selects the smaller of the first command current I1f that is calculated by the first current calculating unit 142 and a first current limit value I1lim for overcurrent protection as a final first command current Iref1. An upper limit value or a lower limit value of the first command current Iref1 that is outputted from the first minimum-value selecting unit 143 is limited by a limiter 144.

The first current controller 150 includes a first current-deviation calculating unit 151, a first feedback control unit 152, and a first limiter 153. The first current-deviation calculating unit 151 calculates a first current deviation ΔI1 by subtracting a detection current I1r of the second current sensor 81 from the first command current Iref1 that is outputted from the limiter 144.

The first feedback control unit 152 calculates the first command phase φ1 as a manipulated variable for performing feedback control of the calculated first current deviation ΔI1 to 0. An upper limit value or a lower limit value of the calculated first command phase φ1 is limited by the first limiter 153. The first command phase φ1 is inputted to the PWM generating unit 200.

The control unit 100 includes a second command-current setting unit 160 and a second current controller 170 as a configuration for calculating the second command phase φ2.

The second command-current setting unit 160 includes a second current calculating unit 162 and a second minimum-value selecting unit 163. The second current calculating unit 162 calculates a second command current I2f that flows to the second high-potential-side terminal CH2 by dividing inputted second command power P2* by the first power supply voltage V1r that is the detection voltage of the first voltage sensor 70. The second command power P2* is a command value of power that is transmitted between the second full-bridge circuit 52 and the second transformer 57. When the second command power P2* is negative, power is transmitted from the second transformer 57 to the second full-bridge circuit 52.

The second minimum-value selecting unit 163 selects the smaller of the second command current I2f that is calculated by the second current calculating unit 162 and a second current limit value I2lim for overcurrent protection as a final second command current Iref2. An upper limit value or a lower limit value of the second command current Iref2 that is outputted from the second minimum-value selecting unit 163 is limited by a limiter 164.

The second current controller 170 includes a second current-deviation calculating unit 171, a second feedback control unit 172, and a second limiter 173. The second current-deviation calculating unit 171 calculates a second current deviation ΔI2 by subtracting a detection current I2r of the first current sensor 80 from the second command current Iref2 that is outputted from the limiter 164.

The second feedback control unit 172 calculates the second command phase φ1 as a manipulated variable for performing feedback control of the calculated second current deviation ΔI2 to 0. An upper limit value or a lower limit value of the calculated second command phase φ2 is limited by the second limiter 173. The second command phase φ2 is inputted to the PWM generating unit 200.

The control unit 100 includes a fourth command-current setting unit 180 and a fourth current controller 190 as a configuration for calculating the fourth command phase φ4.

The fourth command-current setting unit 180 includes a fourth current calculating unit 182 and a fourth minimum-value selecting unit 183. The fourth current calculating unit 182 calculates a fourth command current I4f that flows to the fourth high-potential-side terminal CH4 by dividing inputted fourth command power P4* by a third power supply voltage V3r that is a detection voltage of the second voltage sensor 71. The fourth command power P4* is a command value of power that is transmitted between the fourth full-bridge circuit 55 and the second transformer 57. When the fourth command power P4* is positive, power is transmitted from the fourth full-bridge circuit 55 to the second transformer 57.

The fourth minimum-value selecting unit 183 selects the smaller of the fourth command current I4f that is calculated by the fourth current calculating unit 182 and a fourth current limit value I4lim for overcurrent protection as a final fourth command current Iref4. An upper limit value or a lower limit value of the fourth command current Iref4 that is outputted from the fourth minimum-value selecting unit 183 is limited by a limiter 184.

The fourth current controller 190 includes a fourth current-deviation calculating unit 191, a fourth feedback control unit 192, and a fourth limiter 193. The fourth current-deviation calculating unit 191 calculates a fourth current deviation ΔI4 by subtracting a detection current I4r of the third current sensor 82 from the fourth command current Iref4 that is outputted from the limiter 184.

The fourth feedback control unit 192 calculates the fourth command phase φ4 as a manipulated variable for performing feedback control of the calculated fourth current deviation ΔI4 to 0. An upper limit value or a lower limit value of the calculated fourth command phase φ2 is limited by the fourth limiter 193. The fourth command phase φ4 is inputted to the PWM generating unit 200.

The PWM generating unit 200 generates the drive signals of the switches Q1 to Q16 and outputs the drive signals to the gates of the switches Q1 to Q16 such that the first command phase φ1, the second command phase φ2, and the fourth command phase φ4 can be actualized.

According to the present embodiment, the temperature-increase mode control in which the switches Q1 to Q16 are on-off-controlled is performed such that the output power of the storage battery 10 circulates through a path that includes the first full-bridge circuit 51, the first transformer 56, the third full-bridge circuit 54, the electrical paths 63 and 64, the fourth full-bridge circuit 55, the second transformer 57, the second full-bridge circuit 52, and the electrical paths 61 and 62. Therefore, respective absolute values of the first command power P1*, the second command power P2*, and the fourth command power P4* are set to the same value as one another. In addition, the first command power P1* and the fourth command power P4* are set to a positive value, and the second command power P2* is set to a negative value.

When the temperature-increase mode control according to the present embodiment is performed, as shown in FIGS. 14(e) and (f), current values and the like transition. FIG. 14(e) shows transitions in the first to fourth currents I1 to I4. The fourth current I4 is a current that flows to the fourth high-potential-side terminal CH4. The fourth current I4 is positive when the fourth current I4 flows in a direction from the second high-potential side electrical path 63 towards the fourth high-potential-side terminal CH4.

FIG. 14(f) shows transitions in first to fourth powers P1 to P4 and total power (=P1+P2+P3+P4). The first power P1 is a time average value of power that is transmitted between the first full-bridge circuit 51 and the first transformer 56. The second power P2 is a time average value of power that is transmitted between the second full-bridge circuit 52 and the second transformer 57. The third power P3 is a time average value of power that is transmitted between the third full-bridge circuit 54 and the first transformer 56. The fourth power P4 is a time average value of power that is transmitted between the fourth full-bridge circuit 55 and the second transformer 57. Because the total power is greater than 0, loss occurs in the power conversion circuit 50 as a result of the temperature-increase mode control being performed. Heat is generated as a result of this loss. The heat that is generated is absorbed by the heat transferring unit 45.

According to the present embodiment described above, effects similar to those according to the first embodiment can be achieved.

Variation Examples According to the Third Embodiment

Among the full-bridge circuits 51, 52, 54, and 55 shown in FIG. 12, a full-bridge circuit in which power is in an inputted state may be configured by a bridge circuit such as a diode.

Fourth Embodiment

Figure 15:
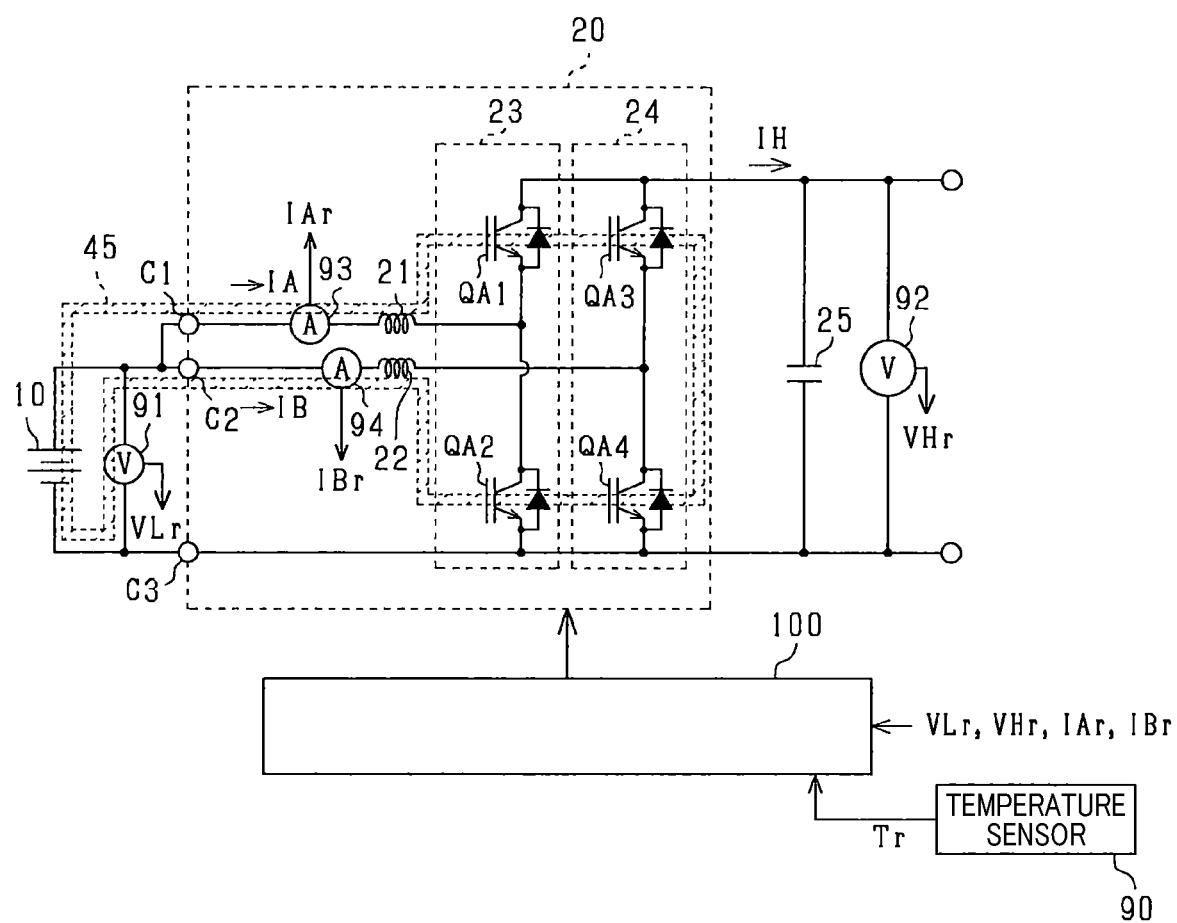
FIG. 15 is a configuration diagram illustrating a power supply system according to a fourth embodiment.

A fourth embodiment will be described below with reference to the drawings, mainly focusing on differences with the first embodiment. According to the present embodiment, the temperature-increase mode control is applied to the DCDC converter 20 shown in FIG. 15. In FIG. 15, configurations that are identical or correspond to the configurations shown in FIG. 1 above are given the same reference numbers for convenience.

The positive electrode terminal of the storage battery 10 is connected to a first terminal C1 and a second terminal C2 of the DCDC converter 20. The negative electrode terminal of the storage battery 10 is connected to a third terminal C3 of the DCDC converter 20.

The DCDC converter 20 includes a first reactor 21, a second reactor 22, a first bridge circuit 23, a second bridge circuit 24, and a capacitor 25. The first bridge circuit 23 includes a series-connection body of a first upper-arm switch QA1 and a first lower-arm switch QA2. The second bridge circuit 23 includes a series-connection body of a second upper-arm switch QA2 and a second lower-arm switch QA2. According to the present embodiment, the switches QA1 to QA4 are insulated-gate bipolar transistors (IGBTs).

The first terminal C1 is connected to the first end of the first reactor 21. An emitter of the first upper-arm switch QA1 and a collector of the first lower-arm switch QA2 are connected to a second end of the first reactor 21. The second terminal C2 is connected to a first end of the second reactor 22. An emitter of the second upper-arm switch QA3 and a collector of the second lower-arm switch QA4 are connected to a second end of the second reactor 22.

A first end of the capacitor 25 is connected to collectors of the first upper-arm switch QA1 and the second upper-arm switch QA3. A second end of the capacitor 25 and the third terminal C3 are connected to emitters of the first lower-arm switch QA2 and the second lower-arm switch QA4.

The heat transferring unit 45 further sets the first reactor 21, the second reactor 22, and the switches QA1 to QA4 as the heat-exchange target elements.

The power supply system includes an input-side voltage sensor 91, an output-side voltage sensor 92, a first reactor-current sensor 93, and a second reactor-current sensor 94. The input-side voltage sensor 91 detects a potential difference of the first and second terminals C1 and C2 in relation to the third terminal C3. The output-side voltage sensor 92 detects an inter-terminal voltage of the capacitor 25. The first reactor-current sensor 93 detects a current that flows to the first reactor 21. The second reactor-current sensor 94 detects a current that flows to the second reactor 22. According to the present embodiment, a current IA that flows in a direction from the first end side towards the second end side in the first reactor 21 is positive. A current IB that flows in a direction from the first end side towards the second end side in the second reactor 22 is positive. Detection values of the input-side voltage sensor 91, the output-side voltage sensor 92, the first reactor-current sensor 93, and the second reactor-current sensor 94 are inputted to the control unit 100.

Figure 16:
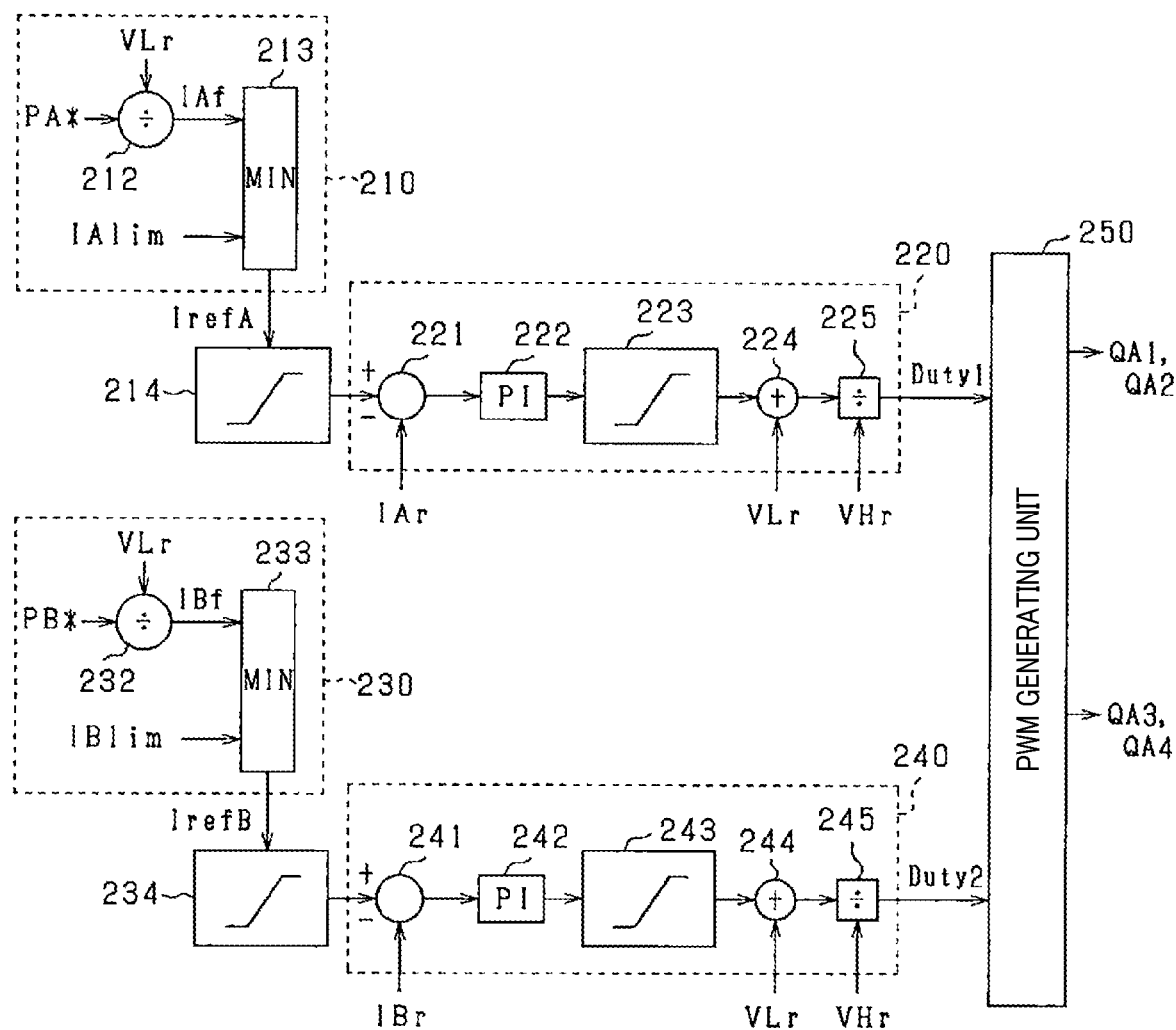
FIG. 16 is a functional block diagram illustrating processes of a control unit.

Next, the temperature-increase mode control performed by the control unit 100 will be described with reference to FIG. 16. Here, in FIG. 16, illustration of the command-power limiting unit 111 is omitted.

The control unit 100 includes a first command-current setting unit 210 and a first current controller 220. The first command-current setting unit 210 includes a first current calculating unit 212 and a first minimum-value selecting unit 213. The first current calculating unit 212 calculates a first command current IAf that flows to the first reactor 21 by dividing inputted first command power PA* by a detection voltage VLr of the input-side voltage sensor 91. The first command power PA* is a command value of power that is transmitted between the first terminal C1 and the first bridge circuit 23. When the first command power PA* is positive, power is transmitted from the first terminal C1 to the first bridge circuit 23.

Here, in the first current calculating unit 212, the detection voltage V1r of the voltage sensor 70 may be used instead of the detection voltage VLr of the input-side voltage sensor 91.

The first minimum-value selecting unit 213 selects the smaller of the first command current IAf that is calculated by the first current calculating unit 212 and a first current limit value IAlim for overcurrent protection as a final first command current IrefA. An upper limit value or a lower limit value of the first command current IrefA that is outputted from the first minimum-value selecting unit 213 is limited by a limiter 214.

The first current controller 220 includes a first current-deviation calculating unit 221, a first feedback control unit 222, a first limiter 223, a first adding unit 224, and a first duty calculating unit 225. The first current-deviation calculating unit 221 calculates a first current deviation ΔIA by subtracting a detection current IAr of the first reactor-current sensor 93 from the first command current IrefA that is outputted from the limiter 214.

The first feedback control unit 222 calculates a first voltage V1 as a manipulated variable for performing feedback control of the calculated first current deviation ΔIA to 0. An upper limit value or a lower limit value of the calculated first voltage V1 is limited by the first limiter 223. The first voltage V1 is inputted to the first adding unit 224. The first adding unit 224 adds the detection voltage VLr of the input-side voltage sensor 91 to the first voltage V1 that is outputted from the first limiter 223.

The first duty calculating unit 225 calculates a first duty Duty1 by dividing [V1+VLr] that is calculated by the first adding unit 224 by a detection voltage VHr of the output-side voltage sensor 92. The first duty Duty1 is a value that prescribes a ratio (=Ton1/Tcsw) of an on-period Ton1 of the first upper-arm switch QA1 to a single switching cycle Tcsw.

A PWM generating unit 250 generates the drive signals of the first upper- and lower-arm switches QA1 and QA2 based on a magnitude comparison between the first duty Duty1 and a carrier signal Sg (triangular-wave signal), and outputs the drive signals to gates of the first upper- and lower-arm switches QA1 and QA2. Here, the first upper-arm switch QA1 and the first lower-arm switch QA2 are alternately turned on.

The control unit 100 includes a second command-current setting unit 230 and a second current controller 240. The second command-current setting unit 230 includes a second current calculating unit 232 and a second minimum-value selecting unit 233. The second current calculating unit 222 calculates a second command current IBf that flows to the second reactor 22 by dividing inputted second command power PB* by the detection voltage VLr of the input-side voltage sensor 91. The second command power PB* is a command value of power that is transmitted between the second terminal C2 and the second bridge circuit 24. When the second command power PB* is positive, power is transmitted from the second terminal C2 to the second bridge circuit 24.

The second minimum-value selecting unit 233 selects the smaller of the second command current IBf that is calculated by the second current calculating unit 232 and a second current limit value IBlim for overcurrent protection as a final second command current IrefB. An upper limit value or a lower limit value of the second command current IrefB that is outputted from the second minimum-value selecting unit 233 is limited by a limiter 234.

The second current controller 240 includes a second current-deviation calculating unit 241, a second feedback control unit 242, a second limiter 243, a second adding unit 244, and a second duty calculating unit 245. The second current-deviation calculating unit 241 calculates a second current deviation ΔIB by subtracting a detection current IBr of the second reactor-current sensor 94 from the second command current IrefB that is outputted from the limiter 234.

The second feedback control unit 242 calculates a second voltage V2 as a manipulated variable for performing feedback control of the calculated second current deviation ΔIB to 0. An upper limit value or a lower limit value of the calculated second voltage V2 is limited by the second limiter 243. The second voltage V2 is inputted to the second adding unit 244. The second adding unit 244 adds the detection voltage VLr of the input-side voltage sensor 91 to the second voltage V2 that is outputted from the second limiter 243.

The second duty calculating unit 245 calculates a second duty Duty2 by dividing [V2+VLr] that is calculated by the second adding unit 244 by the detection voltage VHr of the output-side voltage sensor 92. The second duty Duty2 is a value that prescribes a ratio (=Ton2/Tcsw) of an on-period Ton2 of the second upper-arm switch QA3 to the single switching cycle Tcsw.

The PWM generating unit 250 generates the drive signals of the second upper- and lower-arm switches QA3 and QA4 based on a magnitude comparison between the second duty Duty2 and the carrier signal Sg, and outputs the drive signals to gates of the second upper- and lower-arm switches QA3 and QA4. Here, the second upper-arm switch QA3 and the second lower-arm switch QA4 are alternately turned on.

According to the present embodiment, either of the first command power PA* and the second command power PB* is set to a positive value and the other is set to a negative value. In addition, respective absolute values of the first command power PA* and the second command power PB* are set to the same value. As a result, the output power of the storage battery 10 circulates through a path that includes the first reactor 21, the first upper-arm switch QA1, the second upper-arm switch QA3, and the second reactor 22.

Figure 17:
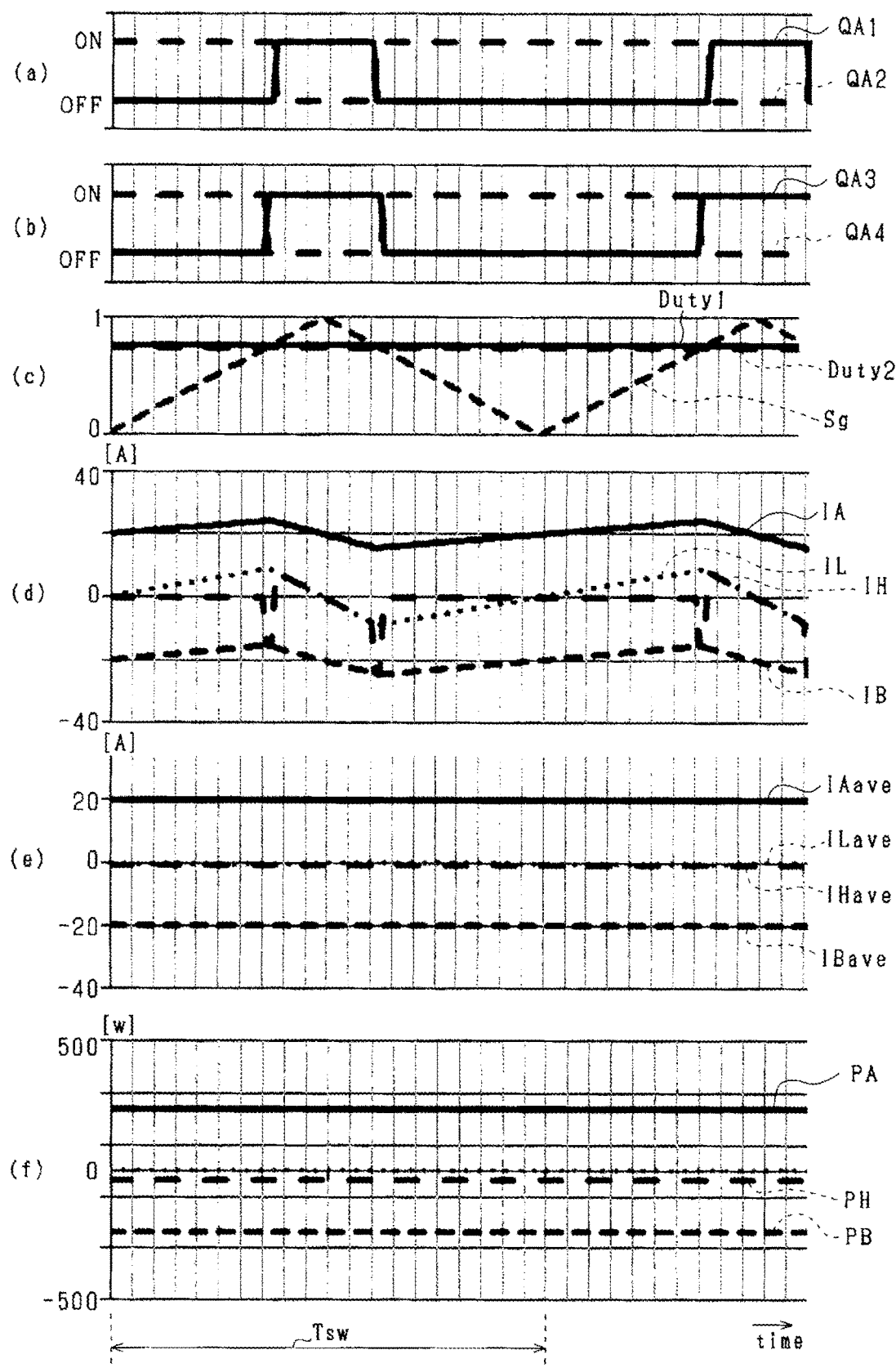

The temperature-increase mode control according to the present embodiment will be described with reference to FIG. 17. FIG. 17(a) shows transitions in driving states of the first upper- and lower-arm switches QA1 and QA2. FIG. 17(b) shows transitions in driving states of the second upper- and lower-arm switches QA3 and QA4. FIG. 17(c) shows transitions in the first and second duties Duty1 and Duty2, and the carrier signal Sg. FIG. 17(d) shows transitions in the currents IA and IB that flow to the first and second reactors 21 and 22, a current IL that flows from the storage battery 10 to the DCDC converter 20, and a current IH that is outputted from the DCDC converter 20. FIG. 17(e) shows transitions in time average values IAave, IBave, ILave, and IHave of the currents IA, IB, IL, and IH.

FIG. 17(f) shows transitions in first power PA, second power PA, and total power (=PA+PB). The first power PA is a time average value of power that is transmitted between the first terminal C1 and the first bridge circuit 23. The second power PB is a time average value of power that is transmitted between the second terminal C2 and the second bridge circuit 24.

PH shown in FIG. 17(f) is an amount of loss that occurs as a result of the temperature-increase mode control. Heat that is absorbed by the heat transferring unit 45 can be generated as a result of this amount of loss, and further, the temperature of the temperature-increase target element can be increased.

Fifth Embodiment

Figure 18:
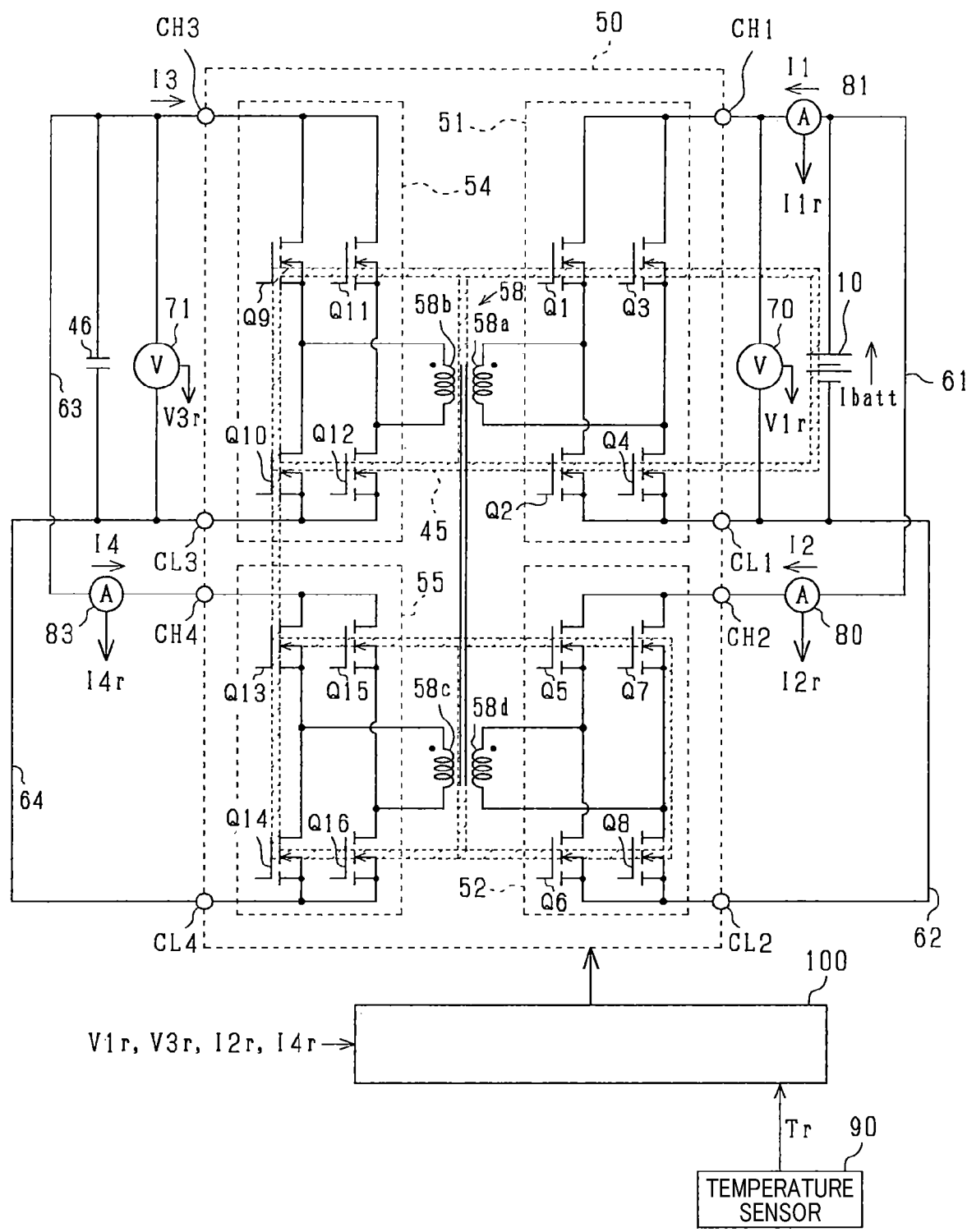
FIG. 18 is a configuration diagram illustrating a power supply system according to a fifth embodiment.

A fifth embodiment will be described below with reference to the drawings, mainly focusing on differences with the third embodiment. According to the present embodiment, as shown in FIG. 18, instead of two transformers, the power conversion circuit 50 includes a single transformer 58. Here, in FIG. 18, configurations that are identical or correspond to the configurations shown in FIG. 12 above are given the same reference numbers for convenience.

The transformer 58 has first to fourth coils 58a to 58d. The source of the first switch Q1 and the drain of the second switch Q2 are connected to a first end of the first coil 58a. The source of the third switch Q3 and the drain of the fourth switch Q4 are connected to a second end of the first coil 58a. The source of the ninth switch Q9 and the drain of the tenth switch Q10 are connected to a first end of the second coil 58b. The source of the eleventh switch Q11 and the drain of the twelfth switch Q12 are connected to a second end of the second coil 58b.

The source of the thirteenth switch Q13 and the drain of the fourteenth switch Q14 are connected to a first end of the third coil 58c. The source of the fifteenth switch Q15 and the drain of the sixteenth switch Q16 are connected to a second end of the third coil 58c. The source of the fifth switch Q5 and the drain of the sixth switch Q6 are connected to a first end of the fourth coil 58d. The source of the seventh switch Q7 and the drain of the eighth switch Q8 are connected to a second end of the fourth coil 58d.

The first to fourth coils 58a to 58d are magnetically coupled to one another. When a potential at the first end in relation to the second end of the first coil 58a is higher, in the second to fourth coils 58b to 58d, an induced voltage that is such that a potential at the first end thereof is higher than that at the second end is generated.

Here, according to the present embodiment, a functional block diagram of the temperature-increase mode control of the control unit 100 is similar to that shown in FIG. 13.

Figure 19:
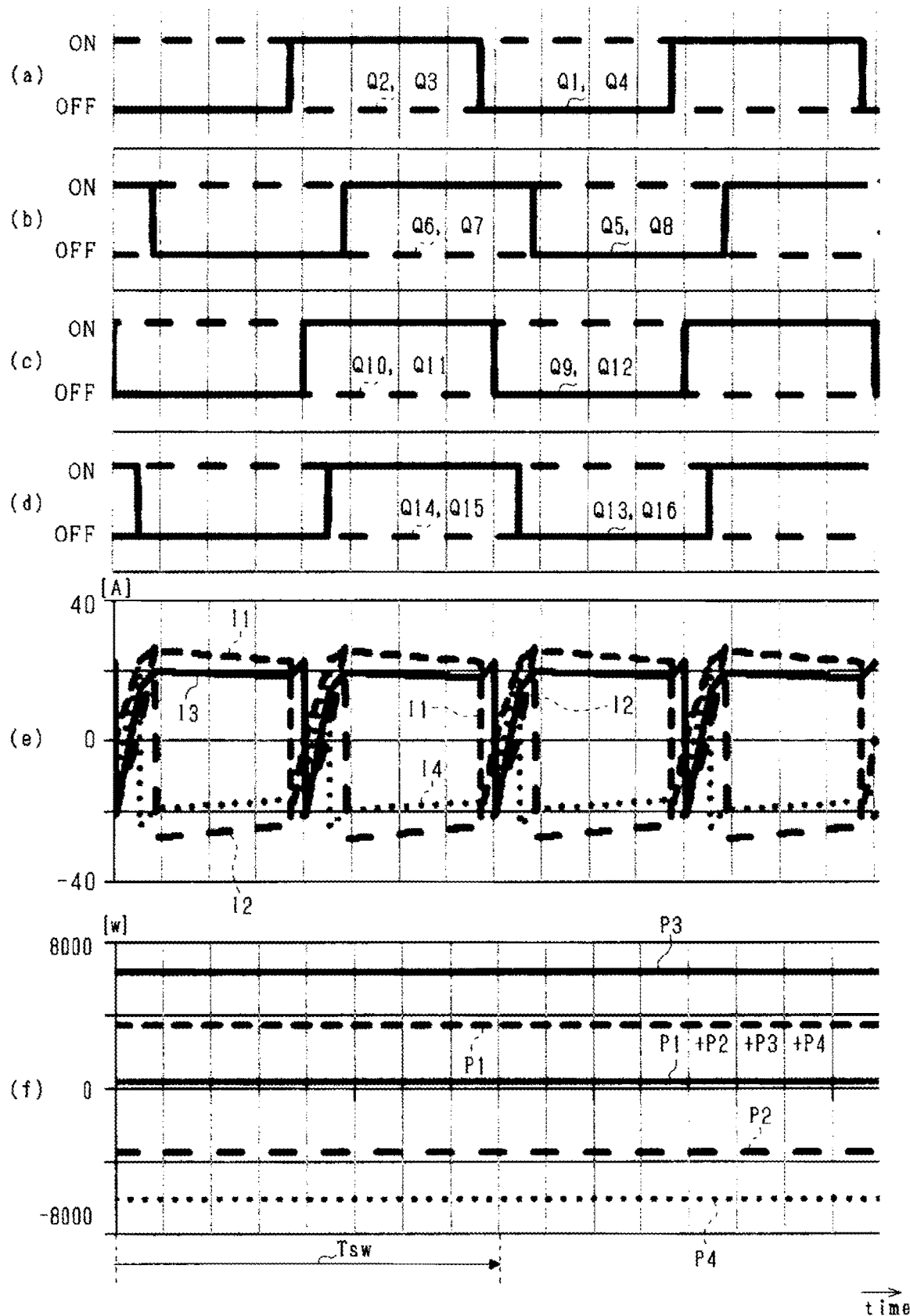

The temperature-increase mode control according to the present embodiment will be described with reference to FIG. 19. FIG. 19(a) to (f) correspond to FIG. 14(a) to (f) above.

According to the present embodiment, the above-described control is performed when an amount of heat that is generated as a result of the temperature-increase mode control is to be equal to or greater than a predetermined amount. Meanwhile, for example, the temperature-increase mode control described according to the first embodiment can be performed when the amount of heat that is generated is to be less than the predetermined amount. Therefore, according to the present embodiment, a degree of freedom in the amount of heat that is generated can be improved.

Sixth Embodiment

Figure 20:
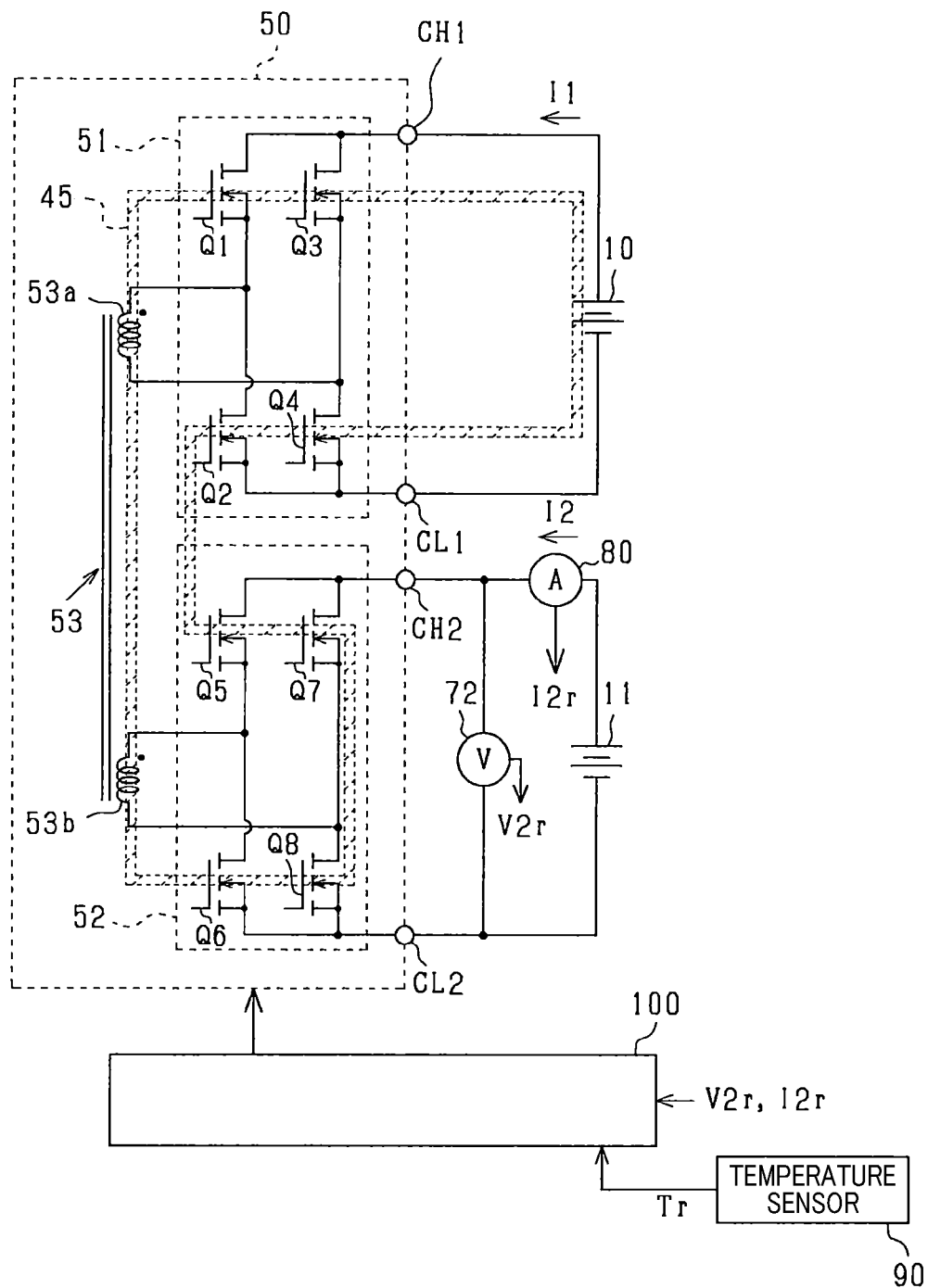
FIG. 20 is a configuration diagram illustrating a power supply system according to a sixth embodiment.

A sixth embodiment will be described below with reference to the drawings, mainly focusing on differences with the first embodiment. According to the present embodiment, as shown in FIG. 20, in addition to the first storage battery 10, a second storage battery 11 is mounted in the vehicle. In FIG. 20, configurations that are identical or correspond to the configurations shown in FIG. 1 above are given the same reference numbers for convenience.

The second storage battery 11 is a chargeable/dischargeable secondary battery. For example, the second storage battery 11 may be a lithium-ion storage battery or a nickel-hydrogen storage battery.

A positive electrode terminal of the second storage battery 11 is connected to the second high-potential-side terminal CH2. A negative electrode terminal of the second storage battery 11 is connected to the second low-potential side terminal CL2.

The power supply system includes the voltage sensor 72. The voltage sensor 72 detects an inter-terminal voltage of the second storage battery 11. A detection value of the voltage sensor 72 is inputted to the control unit 100.

Figure 21:
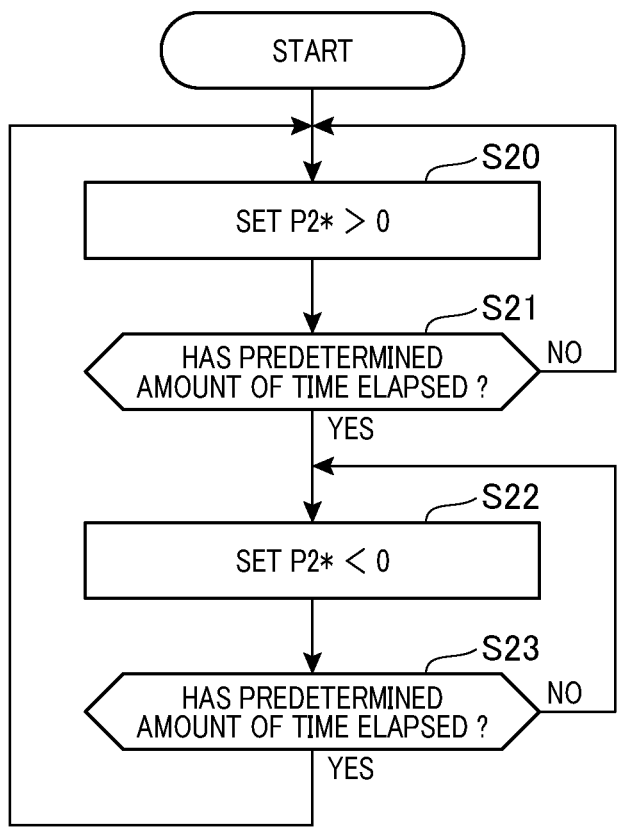
FIG. 21 is a flowchart illustrating processing steps in temperature-increase mode control.

FIG. 21 shows a flowchart of the temperature-increase mode control performed by the control unit 100. For example, this process may be repeatedly performed at a predetermined control cycle.

At step S20, command power P2* is set to a positive value. The command power P2* is a command value of power that is transmitted between the first full-bridge circuit 51 and the second full-bridge circuit 52 through the transformer 53. When the command power P2* is positive, power is transmitted from the first full-bridge circuit 51 to the second full-bridge circuit 52 through the transformer 53. The switches Q1 to Q8 are on-off controlled such that a multiplied value of a detection voltage V2r of the voltage sensor 72 and the detection current I2r of the current sensor 80 tracks the command power P2*.

At step S21, whether a predetermined amount of time has elapsed from the command power P2* being switched to the positive value is determined. When determined that the predetermined amount of time has elapsed at step S21, the control unit 100 proceeds to step S22 and switches the command power P2* to a negative value. According to the present embodiment, an absolute value of the command power P2* that is set at step S22 and an absolute value of the command power P2* that is set at step S20 are the same value.

At step S23, whether the predetermined amount of time has elapsed from the command power P2* being switched to the negative value is determined. When determined that the predetermined amount of time has elapsed at step S23, the control unit 100 proceeds to step S20 and switches the command power P2* to a positive value. Then, the switches Q1 to Q8 are on-off controlled such that the multiplied value of the detection voltage V2r of the voltage sensor 72 and the detection current I2r of the current sensor 80 tracks the command power P2*.

According to the present embodiment described above, the switches Q1 to Q8 are on-off controlled such that charging of the first storage battery 10 and charging of the second storage battery 11 are alternately performed. As a result, an amount of generated heat can be controlled.

Variation Examples According to the Sixth Embodiment

For example, instead of the configuration in which the sign of the command power P2* is switched every time the predetermined amount of time elapses, the sign may be switched based on a potential difference of the first high-potential-side terminal CH1 to the first low-potential-side terminal CL1, or the potential difference of the second low-potential-side terminal CL2 to the second high-potential-side terminal CH2. Alternatively, the signal may be switched based on degrees of charging (such as states of charge [SOC]) of the storage batteries 10 and 11.

The absolute value of the command power P2* that is set at step S20 in FIG. 21 and the absolute value of the command power P2* that is set at step S22 may differ. When the absolute value of the command power P2* that is set at step S20 is greater than the absolute value of the command power P2* that is set at step S22, the second storage battery 11 is charged by the output power of the first storage battery 10. Meanwhile, when the absolute value of the command power P2* that is set at step S20 is smaller than the absolute value of the command power P2* that is set at step S22, the first storage battery 10 is charged by the output power of the second storage battery 11. As a result of the configuration described above, charging from either of the first storage battery 10 and the second storage battery 11 to the other can also be performed, while the temperature-increase mode control is being performed.

For example, instead of the storage batteries 10 and 11, an energy buffer element such as a capacitor, an external power supply that is capable of bi-directional power transfer, and the like may be used.

Seventh Embodiment

Figure 22:
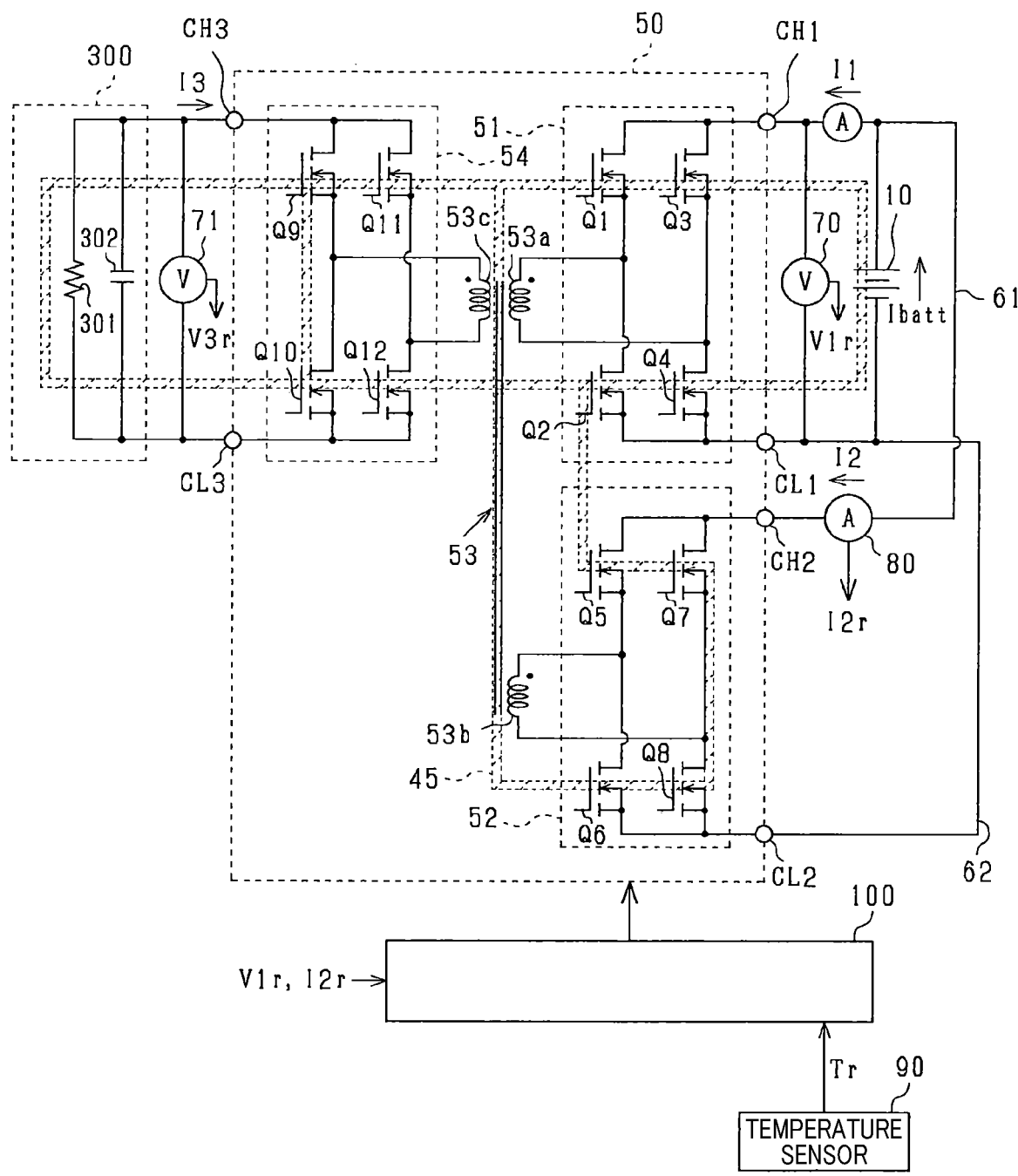
FIG. 22 is a configuration diagram illustrating a power supply system according to a seventh embodiment.

A seventh embodiment will be described below with reference to the drawings, mainly focusing on differences with the second embodiment. According to the present embodiment, as shown in FIG. 22, the power supply system includes a heat generation apparatus 300. In FIG. 22, configurations that are identical to the configurations shown in FIG. 9 and FIG. 12 above are given the same reference numbers for convenience.

The heat generation apparatus 300 includes a resistor 301 and a capacitor 302. The third high-potential-side terminal CH3 is connected to respective first ends of the resistor 301 and the capacitor 302. The third low-potential-side terminal CL3 is connected to second ends thereof.

The heat generation apparatus 300 controls an amount of generated heat based on the environmental temperature and transfers the generated heat to the heat transferring unit 45. According to the present embodiment, the third full-bridge circuit 54 is used for power supply to the heat generation apparatus 300. As a result, energization control of the heat generation apparatus 300 can be performed without a new component being added.

According to the present embodiment described above, in addition to the heat that is generated as a result of the temperature-increase mode control, the heat that is generated by the heat generation apparatus 300 can also be transferred to the heat transferring unit 45.

In addition, when a temperature difference between the heat-exchange target element, such as the switches Q1 to Q12, and the heat transferring unit 45 is small, an amount of heat that is transferred from the heat-exchange target element to the heat transferring unit 45 is small. In this case as well, as a result of the heat generation apparatus 300, sufficient heat can be transferred to the heat transferring unit 45 without being affected by the temperature difference.

Eighth Embodiment

An eighth embodiment will be described below with reference to the drawings, mainly focusing on differences with the first embodiment. According to the present embodiment, when the temperature increase request is present, a gate voltage when the switches Q1 to Q8 are turned on is decreased compared to that when the temperature-increase request is not present, and the switches Q1 to Q8 are set to a half-on state.

Figure 23:
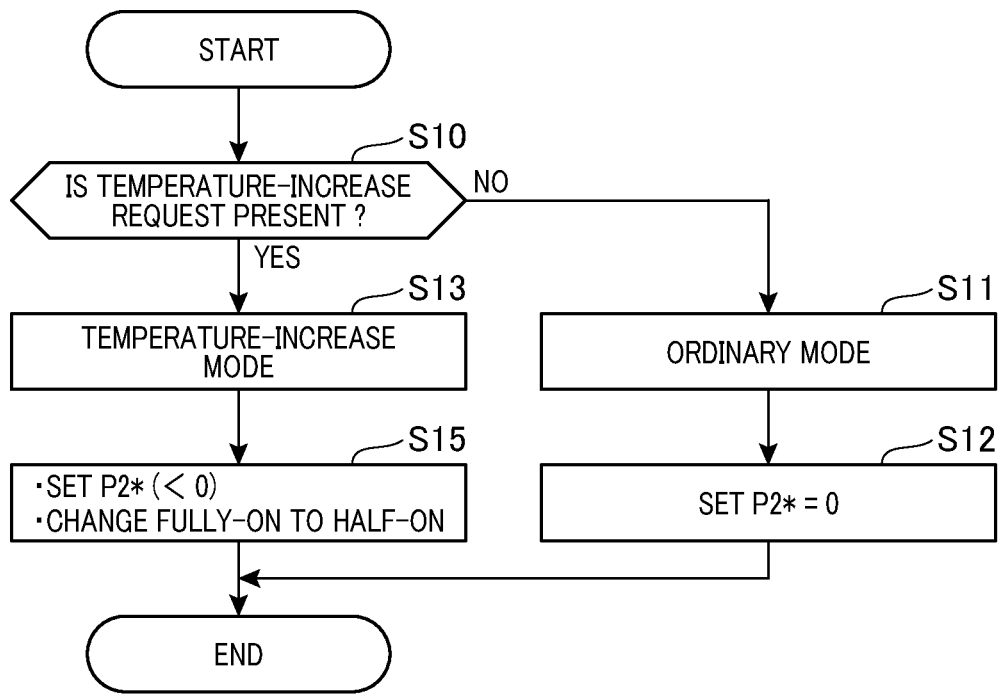
FIG. 23 is a flowchart illustrating processing steps in temperature-increase mode control according to an eighth embodiment.

FIG. 23 shows a flowchart of the temperature-increase mode control performed by the control unit 100. In FIG. 23, processes that are identical to the processes shown in FIG. 8 above are given the same reference numbers for convenience.

After completion of the process at step S13, the control unit 100 proceeds to step S15 and sets the switches Q1 to Q8 to a half-on state rather than a fully-on state when the switches are turned on. The half-on state is a state in which the gate voltage when the switch is turned on is set to a voltage that drives the switch in a saturation region. The saturation region is a region in which a drain current of the switch is substantially fixed regardless of a magnitude of a drain-source voltage, in output characteristics in which the drain-source voltage and the drain current are associated.

According to the present embodiment described above, on-resistance of the switch that is turned on in the temperature-increase mode control can be increased compared to the on-resistance in the fully-on state. Therefore, the amount of heat that is generated as a result of the temperature-increase mode control can be suitably increased.

Other Embodiments

Here, the above-described embodiments may be modified in the following manner.

The power storage unit is not limited to the storage battery and may, for example, be a capacitor.

The control unit and the method thereof described in the present disclosure may be actualized by a dedicated computer that is provided such as to be configured by a processor and a memory, the processor being programmed to provide one or a plurality of functions that are realized by a computer program. Alternatively, the control unit and the method thereof described in the present disclosure may be actualized by a dedicated computer that is provided by a processor being configured by a single dedicated hardware logic circuit or more. As another alternative, the control unit and the method thereof described in the present disclosure may be actualized by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions performed by the computer.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A power supply system that includes a power conversion circuit that is connectable to a power storage unit, the power supply system comprising:
   a switch that is provided in the power conversion circuit;
   a control unit that supplies a current between the power storage unit and the power conversion circuit by performing on-off control of the switch n the power conversion circuit; and
   a heat transferring unit that absorbs heat that is generated in the power conversion circuit including the switch in accompaniment with the on-off control of the switch and transfers the heat to a temperature-increase target element, wherein
   the control unit performs temperature-increase mode control in which the switch in the power conversion circuit is on-off controlled such that an amount of heat that is generated in the power conversion circuit including the switch is increased when a temperature-increase request for the temperature-increase target element is present, compared to when the temperature-increase request is not present.

2. The power supply system according to claim 1, wherein:
   the power conversion circuit includes
      a first terminal and a second terminal,
      an electrical path that connects the first terminal and the second terminal, and is connected to the power storage unit,
      a transformer that has a first coil and a second coil that are magnetically coupled to each other,
      a first conversion circuit that is connected to the first coil and the first terminal, and includes a first conversion switch as the switch, and
      a second conversion circuit that is connected to the second coil and the second terminal, and includes a second conversion switch as the switch; and
   the control unit performs on-off control of the first conversion switch and the second conversion switch such that power from the power storage unit is inputted to either terminal of the first terminal and the second terminal, and power is outputted from the other terminal to the power storage unit, in the temperature-increase mode control.

3. The power supply system according to claim 2, wherein:
   the transformer has a third coil that is magnetically coupled to the first coil and the second coil; and
   the power conversion circuit includes
      a third terminal, and
      a third conversion circuit that is connected to the third coil and the third terminal, and includes a third conversion switch as the switch.

4. The power supply system according to claim 1, wherein:
   the power conversion circuit includes
      a first terminal, a second terminal, a third terminal, and a fourth terminal,
      a first electrical path that connects the first terminal and the second terminal, and is connected to the power storage unit, a second electrical path that connects the third terminal and the fourth terminal, a first transformer that has a first coil and a second coil that are magnetically coupled to each other, a second transformer that has a third coil and a fourth coil that are magnetically coupled to each other, a first conversion circuit that is connected to the first coil and the first terminal, and includes a first conversion switch as the switch, a second conversion circuit that is connected to the third coil and the second terminal, and includes a second conversion switch as the switch, a third conversion circuit that is connected to the second coil and the third terminal, and includes a third conversion switch as the switch, and a fourth conversion circuit that is connected to the fourth coil and the fourth terminal, and has a fourth conversion switch as the switch; and the control unit performs on-off control of the first conversion switch, the second conversion switch, the third conversion switch, and the fourth conversion switch such that output power of the power storage unit circulates through a path that includes the first terminal, the first conversion circuit, the first transformer, the third conversion circuit, the third terminal, the second electrical path, the fourth terminal, the fourth conversion circuit, the second transformer, the second conversion circuit, the second terminal, and the first electrical path, in the temperature-increase mode control.

5. The power supply system according to claim 1, wherein:

the power conversion circuit includes a first terminal to which a positive electrode terminal of the power storage unit is connected, a second terminal to which a negative electrode terminal of the power storage unit is connected, a first reactor of which a first end is connected to the first terminal, a second reactor of which a first end is connected to the second terminal, a first bridge circuit that includes a series-connection body of a first upper-arm switch and a first lower-arm switch as the switch, in which a second end of the first reactor is connected to a connection point between the first upper-arm switch and the first lower-arm switch, and a second bridge circuit that includes a series-connection body of a second upper-arm switch and a second lower-arm switch as the switch, in which a second end of the second reactor is connected to a connection point between the second upper-arm switch and the second lower-arm switch; and the control unit performs on-off control of the first upper-arm switch, the first lower-arm switch, the second upper-arm switch, and the second lower-arm switch such that output power of the power storage unit circulates through a path that includes the first terminal, the first reactor, the first upper-arm switch, the second upper-arm switch, the second reactor, and the second terminal, in the temperature-increase mode control.

6. The power supply system according to claim 1, wherein:

the power conversion circuit includes a first terminal, a second terminal, a third terminal, and a fourth terminal, a first electrical path that connect the first terminal and the second terminal, and is connected to the power storage unit, a second electrical path that connects the third terminal and the fourth terminal, a transformer that has a first coil, a second coil, a third coil, and a fourth coil (58d) that are magnetically coupled to one another, a first conversion circuit that is connected to the first coil and the first terminal, and includes a first conversion switch as the switch, a second conversion circuit that is connected to the fourth coil and the second terminal, and includes a second conversion switch as the switch, a third conversion circuit that is connected to the second coil and the third terminal, and includes a third conversion switch as the switch, and a fourth conversion circuit that is connected to the third coil and the fourth terminal, and includes a fourth conversion switch as the switch; and the control unit performs on-off control of the first conversion switch, the second conversion switch, the third conversion switch, and the fourth conversion switch such that output power of the power storage unit circulates through a path that includes the first terminal, the first conversion circuit, the first coil, the second coil, the third conversion circuit, the third terminal, the second electrical path, the fourth terminal, the fourth conversion circuit, the third coil, the fourth coil, the second conversion circuit, the second terminal, and the first electrical path, in the temperature-increase mode control.

7. The power supply system according to claim 1, wherein:

the power storage unit includes a first power storage unit and a second power storage unit;

the power conversion circuit includes a first terminal to which the first power storage unit is connected, a second terminal to which the second power storage unit is connected, a transformer that has a first coil and a second coil that are magnetically coupled to each other, a first conversion circuit that is connected to the first coil and the first terminal, and includes a first conversion switch as the switch, and a second conversion circuit that is connected to the second coil and the second terminal, and includes a second conversion switch as the switch; and the control unit performs on-off control of the first conversion switch and the second conversion switch such that a first process in which output power of the first power storage unit is supplied to the second power storage unit through the first terminal, the first conversion circuit, the transformer, the second conversion circuit, and the second terminal, and a second process in which output power of the second power storage unit is supplied to the first power storage unit through the second terminal, the second conversion circuit, the transformer, the first conversion circuit, and the first terminal are alternately performed, in the temperature-increase mode control.

8. The power supply system according to claim 7, wherein:

the control unit sets power that is supplied from the first power storage unit to the second power storage unit in the first process and power that is supplied from the second power storage unit to the first power storage unit in the second process to differing values.

9. The power supply system according to claim 8, comprising:
a heat generation apparatus that generates heat by being supplied power and transfers the generated heat to the heat transferring unit.

10. The power supply system according to claim 9, wherein:
when the temperature-increase request is present, the control unit decreases a gate voltage of the switch when the switch is turned on, compared to that when the temperature-increase request is not present.

11. The power supply system according to claim 10, wherein:
the control unit increases an upper limit value of output power of the power storage unit as a temperature of the temperature-increase target element decreases, in the temperature-increase mode control.

12. The power supply system according to claim 11, wherein:
the power supply system is mountable to a vehicle that includes a rotating electric machine that serves as a traveling power source, the power supply system comprising:
an inverter that is provided separately from the power conversion circuit and is connected to an armature of the rotating electric machine.

13. The power supply system according to claim 1, comprising:
a heat generation apparatus that generates heat by being supplied power and transfers the generated heat to the heat transferring unit.

14. The power supply system according to claim 1, wherein:
when the temperature-increase request is present, the control unit decreases a gate voltage of the switch when the switch is turned on, compared to that when the temperature-increase request is not present.

15. The power supply system according to claim 1, wherein:
the control unit increases an upper limit value of output power of the power storage unit as a temperature of the temperature-increase target element decreases, in the temperature-increase mode control.

16. The power supply system according to claim 1, wherein:
the power supply system is mountable to a vehicle that includes a rotating electric machine that serves as a traveling power source, the power supply system comprising:
an inverter that is provided separately from the power conversion circuit and is connected to an armature of the rotating electric machine.

* * * * *